(12) United States Patent
Oohara et al.

(10) Patent No.: US 7,569,944 B2
(45) Date of Patent: Aug. 4, 2009

(54) WIND POWER GENERATION SYSTEM AND OPERATING METHOD THEREOF

(75) Inventors: Shinya Oohara, Hitachi (JP); Masaya Ichinose, Hitachiota (JP); Motoo Futami, Hitachiota (JP); Tadashi Sodeyama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/116,272

(22) Filed: May 7, 2008

(65) Prior Publication Data
US 2008/0277938 A1 Nov. 13, 2008

(30) Foreign Application Priority Data
May 9, 2007 (JP) .............................. 2007-124060

(51) Int. Cl.
*H02P 9/00* (2006.01)
(52) U.S. Cl. ............................... 290/44; 290/55; 290/7; 322/25; 322/27; 322/28; 322/37
(58) Field of Classification Search ............... 290/55, 290/7, 44; 322/25, 27, 28, 37
See application file for complete search history.

(56) References Cited

U.S. PATENT DOCUMENTS

| 7,342,323 | B2 * | 3/2008 | Avagliano et al. ............. 290/55 |
| 7,417,333 | B2 * | 8/2008 | Miller et al. ................... 290/44 |
| 7,425,771 | B2 * | 9/2008 | Rivas et al. .................... 290/44 |

FOREIGN PATENT DOCUMENTS

| JP | 2006-230085 | 8/2006 |
| WO | WO 2004/067958 A1 | 8/2004 |

OTHER PUBLICATIONS

U.S. Appl. No 11/769,753, filed Jun. 28, 2007, Masaya Ichinose, et al.
U.S. Appl. 11/751,742, filed May 22, 2007, Masaya Ichinose, et al.
U.S. Appl. 11/954,453, filed Dec. 12, 2007, Masaya Ichinose, et al.

* cited by examiner

*Primary Examiner*—Nicholas Ponomarenko
*Assistant Examiner*—Iraj A Mohandesi
(74) *Attorney, Agent, or Firm*—Antonelli, Terry, Stout & Kraus, LLP.

(57) ABSTRACT

A wind power generation system wherein procedure for controlling the blade pitch is changed in accordance with the rate of decrease in the amplitude of the grid voltage, and when over current occurs in the grid-side power converter, the grid-side power converter is brought into the gate-blocked condition whereas the generator-side power converter continues its operation.

16 Claims, 26 Drawing Sheets

WIND POWER GENERATION SYSTEM AND OPERATING METHOD THEREOF

CROSS-REFERENCE TO RELATED APPLICATION

The present application relates to subject matters described in a co-pending patent applications Ser. No. 11/769,753 filed on Jun. 28, 2007 entitled "VARIABLE SPEED WIND POWER GENERATION SYSTEM", Ser. No. 11/751,742 filed on May 22, 2007 entitled "WIND POWER GENERATION APPARATUS, WIND POWER GENERATION SYSTEM AND POWER SYSTEM CONTROL APPARATUS", and Ser. No. 11/954,453 filed on Dec. 12, 2007 entitled "WIND POWER GENERATION SYSTEM" every which by Masaya Ichinose, et al. and assigned to the assignees of the present application. The disclosures of these co-pending applications are incorporated herein by reference.

BACKGROUND OF THE INVENTION

This invention relates to a power generation system connected with a power distribution grid, and more particularly to a wind power generation system connected with a power grid.

When the voltage or frequency of a power grid becomes abnormal, the wind power generation system connected with the power grid stops its power generating operation to protect its constituent devices from damages, and ceases its power supply to the grid. In such a case, the wind power generation system disconnects its main circuit from the power grid by opening the switchgear located between the generator in the system and the grid.

Under this condition, since the wind power generation system cannot supply the generated power to the power grid, the wind power is stored in the form of the rotational energy of the wind turbine, and this stored energy may lead to the harmful over speed of the wind turbine.

International patent publication, WO2004/067958, discloses a technique for avoiding such an over speed of wind turbine. According to this prior art literature, when a grid fault is detected in the power grid, the blades of the windmill are pitched to the park position, and the crowbar circuit simultaneously interrupts over current to the power converter.

SUMMARY OF THE INVENTION

As described above, when a failure occurs in the power grid, the conventional wind power generation system is disconnected from the power grid and the blade pitch is in the park position. Accordingly, when the failure has been eliminated, the wind turbine will usually be in the standstill state, or its rotational speed will be much lower than the speed fast enough for its power generating operation. Thus, with conventional wind power generation systems, the wind turbine cannot resume its power generating operation immediately after the elimination of the failure since some time period is required between the time of failure detection and the time of resuming power generation before the wind turbine reaches a rotational speed suitable for power generation.

As a result, the conventional wind power generation system has suffered a problem that the system cannot generate power for a relatively long time from the recovery of the failed power grid till the wind turbine reaches the rotational speed suitable for power generation.

In addition to this, the conventional wind power generation system has another problem. Namely, in a power grid whose power generation owes to a large extent to a wind power generation system connected to the grid, the delay in the restart of the wind power generation system after the elimination of failure amounts to the inability of a large-scale power generating system included in the grid for a long time. This may collapses the balance of power demand and supply, sometimes causing large fluctuations of grid frequency and voltage and ultimately causing a power failure.

One object of this invention is to provide a wind power generation system which can shorten the time period from the elimination of the failure in the power grid till the wind turbine resumes its power generating operation.

Another object of this invention is to provide a wind power generation system comprising an abnormality detecting unit for detecting an abnormal condition occurring in the wind power generation system or a power grid with which the wind power generation system is connected, a first pitch controlling unit for controlling the blade pitch of the rotor of the wind turbine installed in the wind power generation system when the abnormal condition is not detected, and a second pitch controlling unit for controlling the blade pitch when the abnormal condition is detected, wherein the second pitch controlling unit serves to keep the rotational speed of the rotor within the range for which the wind power generation system can perform power generating operation.

Still another object of this invention is to provide a method for controlling a wind power generation system, wherein when the value of the grid voltage, current or frequency, or the value of the current drawn from the wind power generation system proves to be abnormal, the rotational speed of the rotor is controllably kept in a predetermined range and the generator-side power converter controls the reactive power delivered to the synchronous generator.

According to this invention, the time period from the elimination of the failure in the power grid till the wind turbine resumes its power generating operation can be shortened. Consequently, the amount of power generated by the wind power generation system can be increased.

Other objects, features and advantages of the invention will become apparent from the following description of the embodiments of the invention taken in conjunction with the accompanying drawings.

DESCRIPTION OF THE EMBODIMENT

In order to attain the objects of this invention, the wind power generation system according to this invention incorporates therein a device for detecting the voltage of the power distribution grid and changes the procedure of controlling the pitch of blades in accordance with the decrease in the amplitude of the power grid voltage.

Embodiment 1

The configurations and operations of the wind power generation systems according to an embodiment of the present invention will be described with reference to FIGS. 1 through 16 of the attached drawings.

Figure 1:
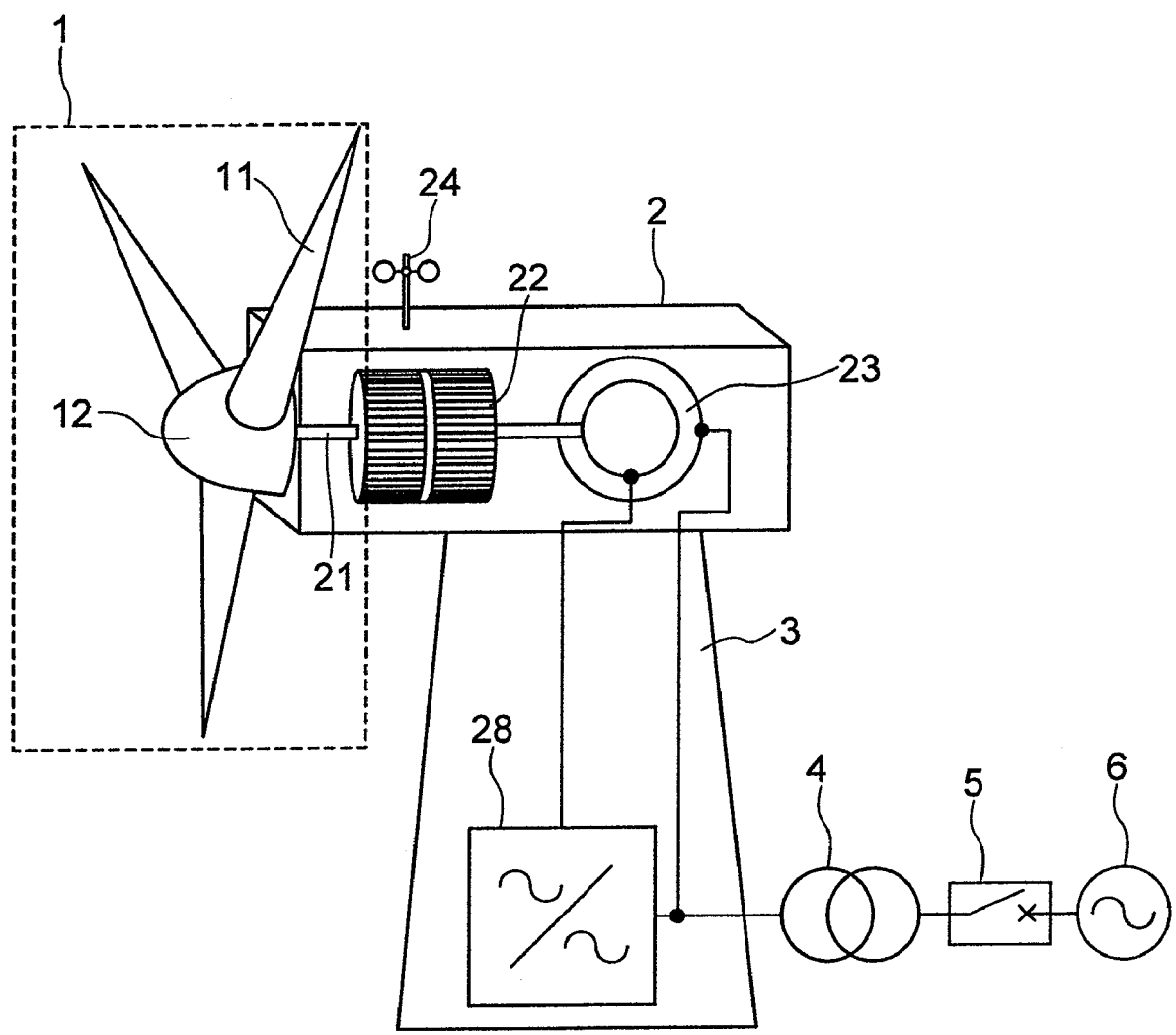
FIG. 1 schematically shows the overall configuration of a wind power generation system incorporating therein a doubly fed induction generator according to an embodiment of the present invention.
Figure 2:
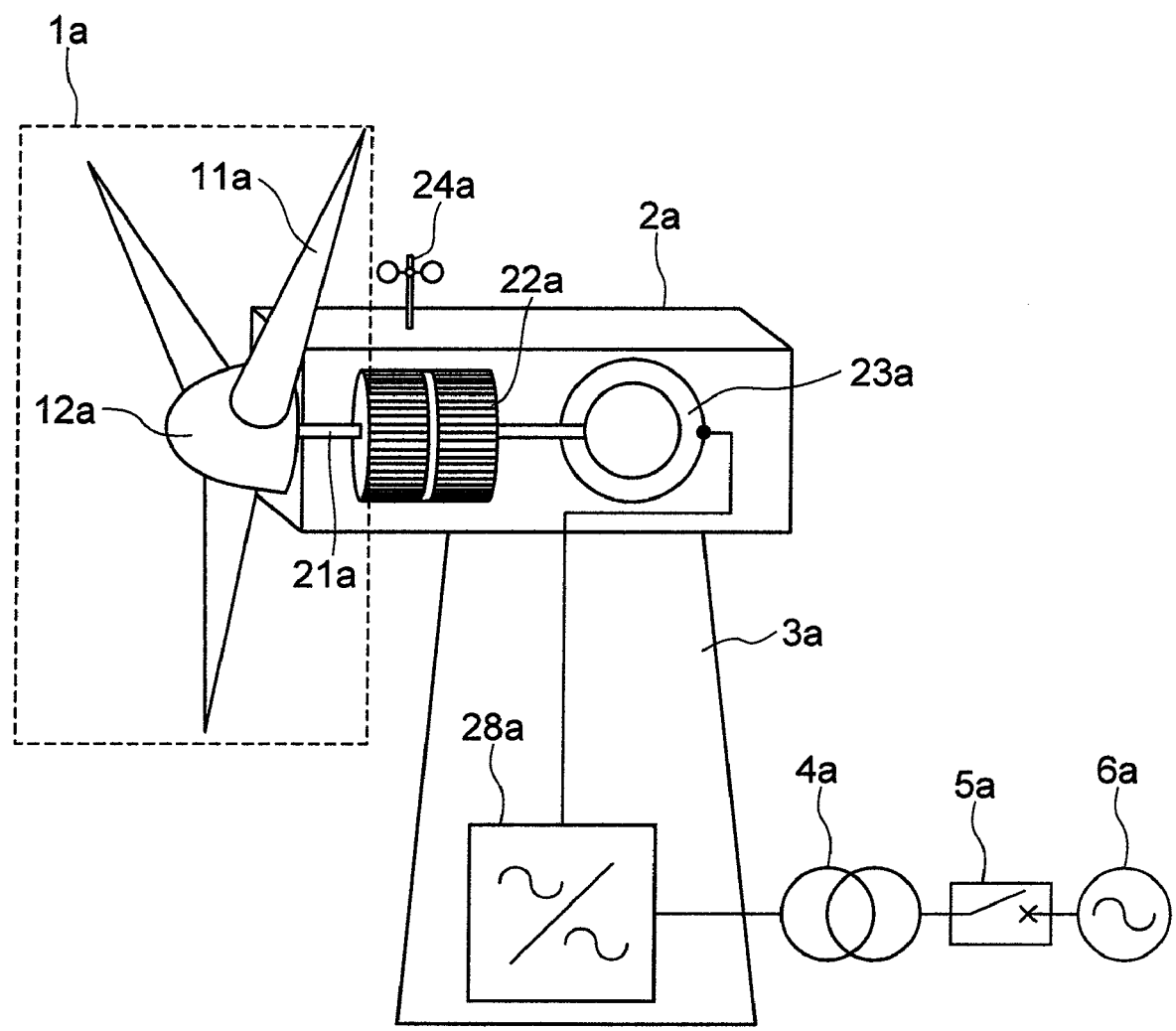
FIG. 2 schematically shows the overall configuration of a wind power generation system incorporating therein a permanent magnet generator or an induction generator according to an embodiment of the present invention.

FIG. 1 schematically shows the overall configuration of a wind power generation system as a first embodiment of this invention. In FIG. 1, the wind power generation system has blades 11 driven by the wind so that the wind energy is turned into rotational energy. The rotational energy in turn causes a hub 12, to which the blades 11 are attached, to rotate. The rotary assembly consisting of the blades 11 and the hub 12 is referred to as a rotor 1. The rotation of the rotor 1 is transferred to an acceleration gear 22 via a shaft 21. The acceleration gear 22 converts the rotational speed of the rotor 1 to a rotational speed suitable for the power generating operation of a generator. In FIG. 1, a doubly fed induction generator 23 is shown as such a generator. The stator winding of the doubly fed induction generator 23 is connected with the power grid. The rotor winding of the doubly fed induction generator 23 is connected via its slip rings with a power converter 28. As shown in FIG. 2, a permanent-magnet type generator 23a, an induction type generator or a synchronous generator can be used equally in this invention.

Now, description is made briefly of the configuration of the control section which plays an important role while the wind power generation system according to this invention is operating in the power generating mode.

Figure 3:
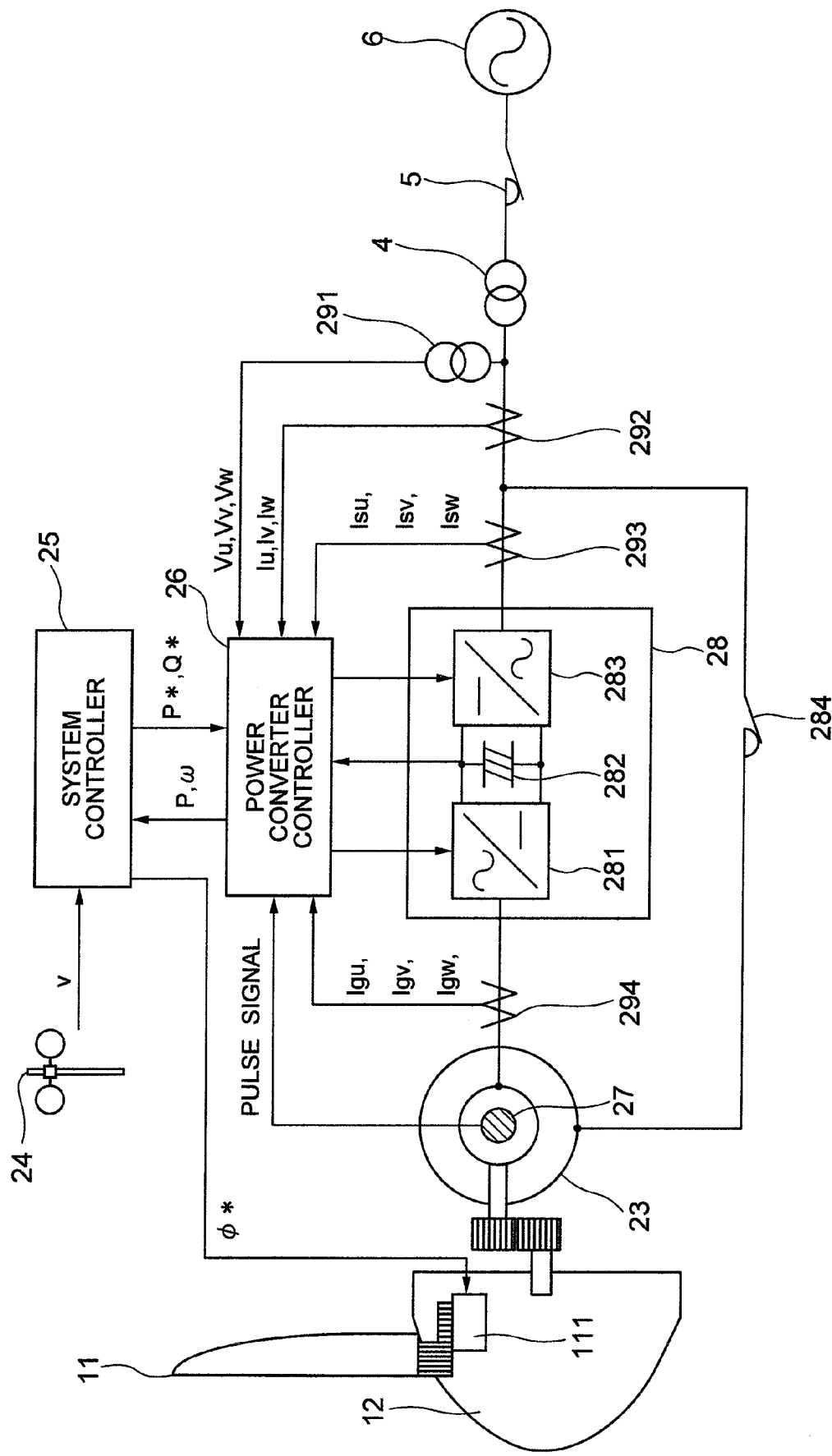
FIG. 3 schematically shows the overall configuration of a wind power generation system using a doubly fed induction generator along with its control section according to an embodiment of the present invention.

FIG. 3 schematically shows the overall configuration of the wind power generation system using a doubly fed induction generator along with its control section. The control section consists mainly of a system controller 25 for controlling the operation of the wind power generation system as a whole and a power converter controller 26 for controlling the power converter 28. The system controller 25 calculates the wind velocity measured by an anemometer 24 and the rotational speed ω [rad/sec] of the rotor 1 derived from the pulse signal of an encoder 27, and also calculates the generation power command P* [W] and the pitch command φ* [degree] on the basis of the power P generated by the wind power generation system.

The power P generated by the wind power generation system can be controlled by means of the power converter controller 26 and the power converter 28. The power converter 28 consists mainly of a generator-side power converter 281, a grid-side power converter 283, and an intermediate (smoothing) capacitor 282. The generator-side power converter 281 and the grid-side power converter 283 may be constituted by using semiconductor switching elements such as IGBTs. The power converter controller 26 takes in three-phase AC voltages Vu, Vv and Vw [V] and three-phase AC currents Iu, Iv and Iw [A], respectively from a voltage detector 291 and a current detector 292, both connected between the wind power generation system and the power grid. The power converter controller 26 internally calculates the voltage amplitude $V_{abs}$, the active power P and the reactive power Q from the obtained three-phase voltages and currents.

The power converter controller 26 subjects the detected voltages and currents to the coordinate transformation in the rotating reference frame, and transforms them into the corresponding d-axis and q-axis components. In the coordinate transformation are used phase signals $\cos(\omega_{sys}t)$ and $\sin(\omega_{sys}t)$ which follow up the U-phase voltage of the power grid, where $\omega_{sys}$ [rad/sec] represents the angular frequency of the AC voltages of the power grid, and t[sec] indicates time. When the phase signal $\cos(\omega_{sys}t)$ coincides with the phase of the U-phase voltage of the power grid, the d- and q-axis components $V_d$ and $V_q$ of the voltage and the d- and q-axis components $I_d$ and $I_q$ of the corresponding current can be calculated from the following expressions (1) and (2).

$$\begin{pmatrix} Id \\ Iq \end{pmatrix} = \frac{2}{3} \begin{pmatrix} \cos(\omega_{sys}t) & \sin(\omega_{sys}t) \\ -\sin(\omega_{sys}t) & \cos(\omega_{sys}t) \end{pmatrix} \begin{pmatrix} 1 & -0.5 & -0.5 \\ 0 & \sqrt{3}/2 & -\sqrt{3}/2 \end{pmatrix} \begin{pmatrix} Iu \\ Iv \\ Iw \end{pmatrix} \quad (1)$$

$$\begin{pmatrix} Vd \\ Vq \end{pmatrix} = \frac{2}{3} \begin{pmatrix} \cos(\omega_{sys}t) & \sin(\omega_{sys}t) \\ -\sin(\omega_{sys}t) & \cos(\omega_{sys}t) \end{pmatrix} \begin{pmatrix} 1 & -0.5 & -0.5 \\ 0 & \sqrt{3}/2 & -\sqrt{3}/2 \end{pmatrix} \begin{pmatrix} Vu \\ Vv \\ Vw \end{pmatrix} \quad (2)$$

The power converter controller 26 calculates active power P [W], reactive power Q [Var], voltage amplitude $V_{abs}$ [Vrms] and current amplitude $I_{abs}$ [Arms] from the obtained $I_d$, $I_q$, $V_d$ and $V_q$ in accordance with the following expressions (3), (4), (5) and (6), respectively.

$$P = I_d \cdot V_d + I_q \cdot V_q \quad (3)$$

$$Q = I_q \cdot V_d - I_d \cdot V_q \quad (4)$$

$$V_{abs} = \sqrt{V_d^2 + V_q^2} \quad (5)$$

$$I_{abs} = \sqrt{I_d^2 + I_q^2} \quad (6)$$

If the phase signal is so formed that the q-axis component of the voltage is zero, i.e. $V_q = 0$, the active power P, the reactive power Q and the voltage amplitude $V_{abs}$ can be given by the following expressions (7), (8) and (9), respectively.

$$P = I_d \cdot V_d \quad (7)$$

$$Q = I_q \cdot V_d \quad (8)$$

$$V_{abs} = |V_d| \quad (9)$$

The power converter controller 26 controls the output current of the generator-side power converter 281 in such a manner that the active power P can follow the power command issued from the system controller 25. To do this control, the power converter controller 26 takes in the value of the current detected by the current detector 294. Simultaneously, the grid-side power converter 283 controls the output current so that the DC voltage of the power converter 28 is maintained at a predetermined value. For this purpose, the power converter controller 26 takes in the value of the current detected by the current detector 293. The power converter controller 26 also sends out to the power converter 28 a gate pulse signal created in accordance with PWM (pulse width modulation) control. The power converter 28 controls the active power and the reactive power of the wind power generation system by performing a switching operation in response to the gate pulse signal. Further, the power converter controller 26 calculates the rotational speed $\omega$ of the rotor 1 by converting the pulse signal detected by the encoder 27 located at the generator to the rotational speed of and the gear ratio for, the generator. The foregoing description is dedicated to the procedure of control of the wind power generation system when the system is under its normal operating condition. It is noted here that the normal operating condition mentioned throughout this specification refers to the condition of operation wherein there is no failure detected in either of the power grid and the wind power generation system connected with the grid.

Figure 4:
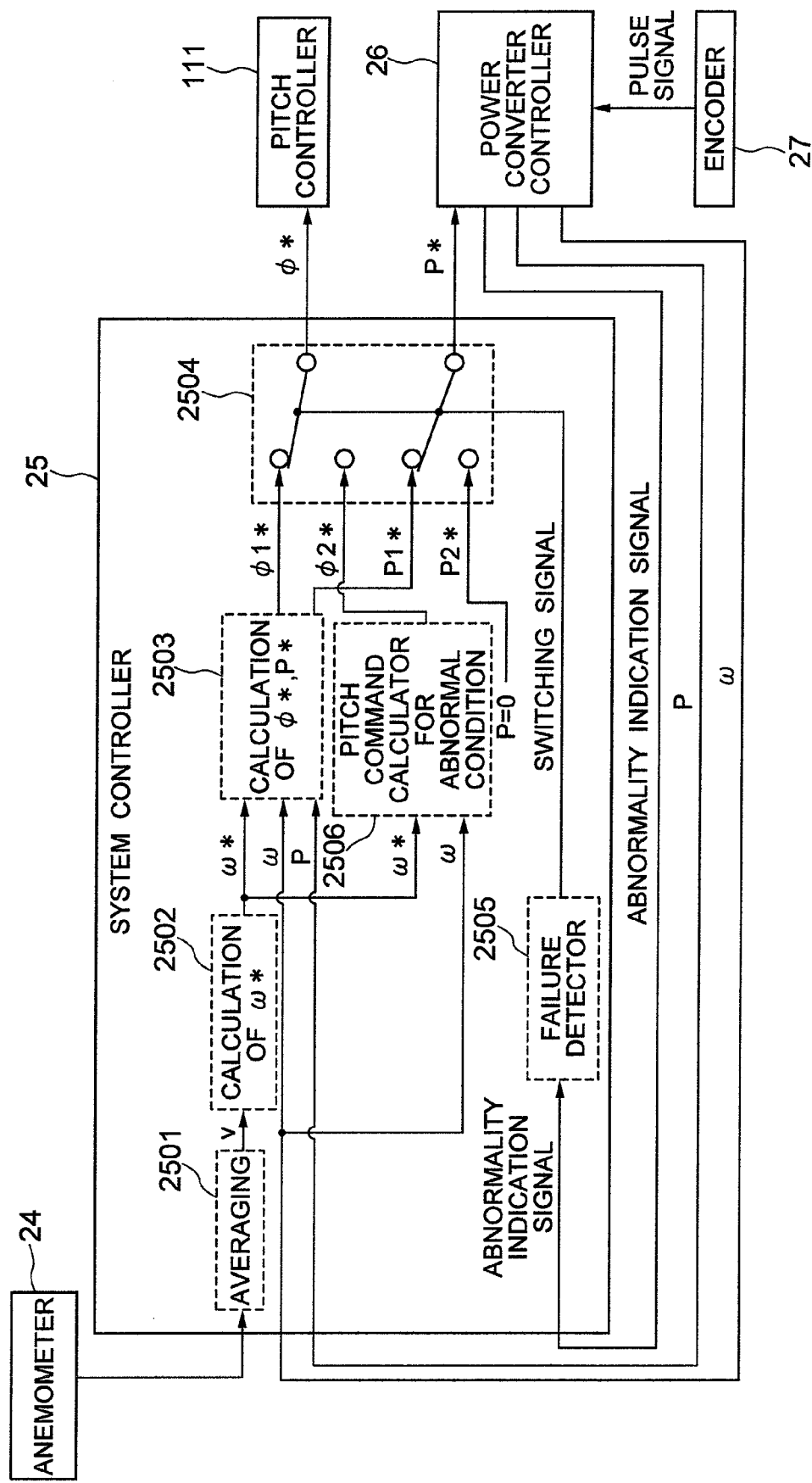
FIG. 4 shows in block diagram the configuration of a pitch control section and a power control section according to an embodiment of the present invention.

The procedure of controlling the blade pitch will now be described according to this invention. FIG. 4 shows in block diagram the configuration of a pitch control section according to this invention. The system controller 25 obtains the averaged wind velocity v [m/sec] by averaging in time the wind velocity measured by the anemometer 24 by means of an average calculator 2501. A rotational speed calculator 2502 derives the rotational speed command $\omega^*$ from the obtained average wind velocity v [m/sec] through table reference. A pitch/power command calculator 2503 calculates the power command P* [W] and the pitch command $\phi^*$ [degree] for the wind turbine blade from the above obtained rotational speed command $\omega^*$, the rotational speed $\omega$ [rad/sec] of the rotor 1 and the generated power P [W]. A pitch controller 111 controls the pitch of the blades 11 in accordance with the pitch command $\phi^*$ [degree] received from the system controller 25. The feature of this invention is that the procedures of controlling the blade pitch and the power generation are switched over between normal power generating operation and continuous operating mode under abnormal condition. It is noted throughout this specification that the continuous operating mode under abnormal condition refers to the operating mode which is entered into after an abnormality has been detected in the wind power generation system or the power grid. To be concrete, the pitch command $\phi^*$ and the power command P* are set to the values produced by the pitch/power command calculator 2503 ($\phi^* = \phi_1^*$, $P^* = P_1^*$) at the time of the normal power generating operation, whereas, in the continuous operating mode under abnormal condition, the pitch command is set to the value ($\phi^* = \phi_z^*$) produced by an pitch command calculator 2506 used under abnormal condition and the power command is set to 0 [W] ($P^* = 0$).

The pitch control serves to control the rotational speed of the rotor 1. The overall energy balance with respect to the rotor 1 is given by the following expression (10).

$$\frac{d}{dt}\left(\frac{1}{2}I\omega^2\right) = P_{in} - P - P_{LOSS} \quad (10)$$

In the expression (10), I is the moment of inertia of rotating body in kg·m²; $\omega$ the rotational speed of the rotor 1 in rad/sec; $P_{in}$ the input power of wind in W; P the generated power of wind power generation system in W; $P_{loss}$ the power loss in W; t the time in sec; and d/dt the differential operator. As apparent from the expression (10), in order to control the rotational speed of the rotor 1, $P_{in}$ must be changed by controlling the blade pitch by the pitch controller 111, or P must be changed by controlling the generated power.

Figure 5:
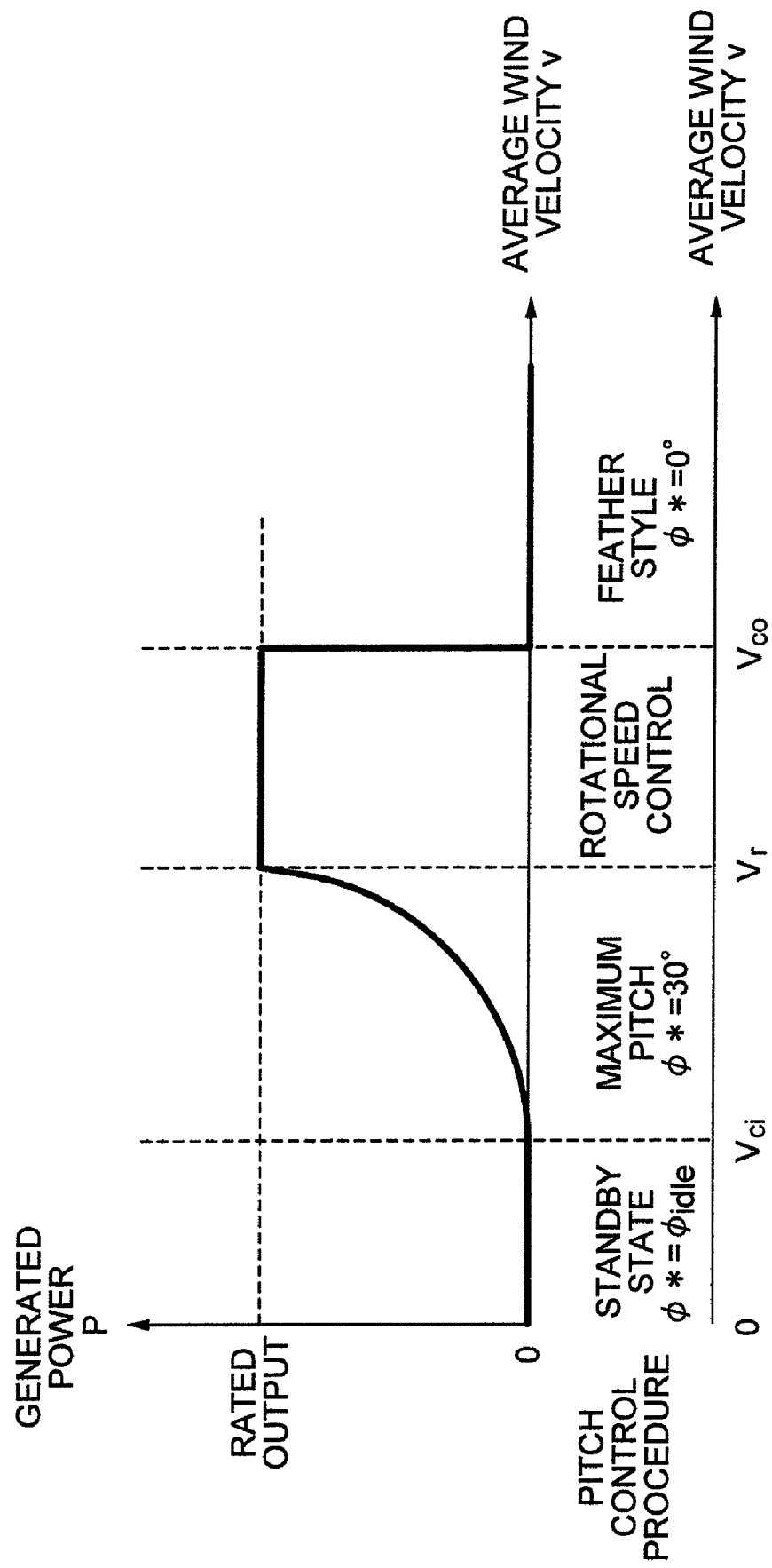
FIG. 5 graphically shows the average wind velocity vs. the procedures of pitch control and the generated power, in the normal power generating operation.

FIG. 5 graphically shows the average wind velocity v vs. the procedures of pitch control and the generated power P, in the normal power generating operation. Only a specific range of wind velocities is available for the purpose of power generation by the wind power generation system. Namely, power generating operation can start when the average wind velocity is higher than the cut-in wind velocity $v_{ci}$. If, on the contrary, the average wind velocity is lower than $v_{ci}$, the system remains in the standby state while the blade pitch is fixed at a predetermined value. The generated power increases with the increase in the wind velocity and assumes a constant level while the wind velocity is higher than a rated velocity $v_r$. When the wind velocity exceeds the cut-out wind velocity $v_{co}$, the system is kept in the standby state, generating no power, by feathering the blades 11 into the direction of the wind (feather state: $\phi = 0$), thereby minimizing the input energy of the wind.

The process of pitch control in the power generating operation can be roughly divided into two sorts, depending on the wind velocity. In one of them, when the average wind velocity v is such that $v_{ci}<v<v_r$, the blade pitch assumes the minimum value ($\phi=30$ degrees) with respect to the wind direction. Under this condition, the wind imparts the maximum energy to the blades 11. Although the rotational speed of the rotor 1 may vary due to the instantaneous change in the wind velocity, the fluctuation of the rotational speed ω can be suppressed by controlling the output power P generated by the wind power generation system. In the other of the sorts, when the average wind velocity v is such that $v_r<v<v_{co}$, the system controller 25 fixes the generated power P to the value of the rated power. The generated power P of the wind power generation system is controlled to assume a constant level by means of the power converter 28. During this control, the rotational speed ω is varied by changing the pitch of the blades.

Figure 6:
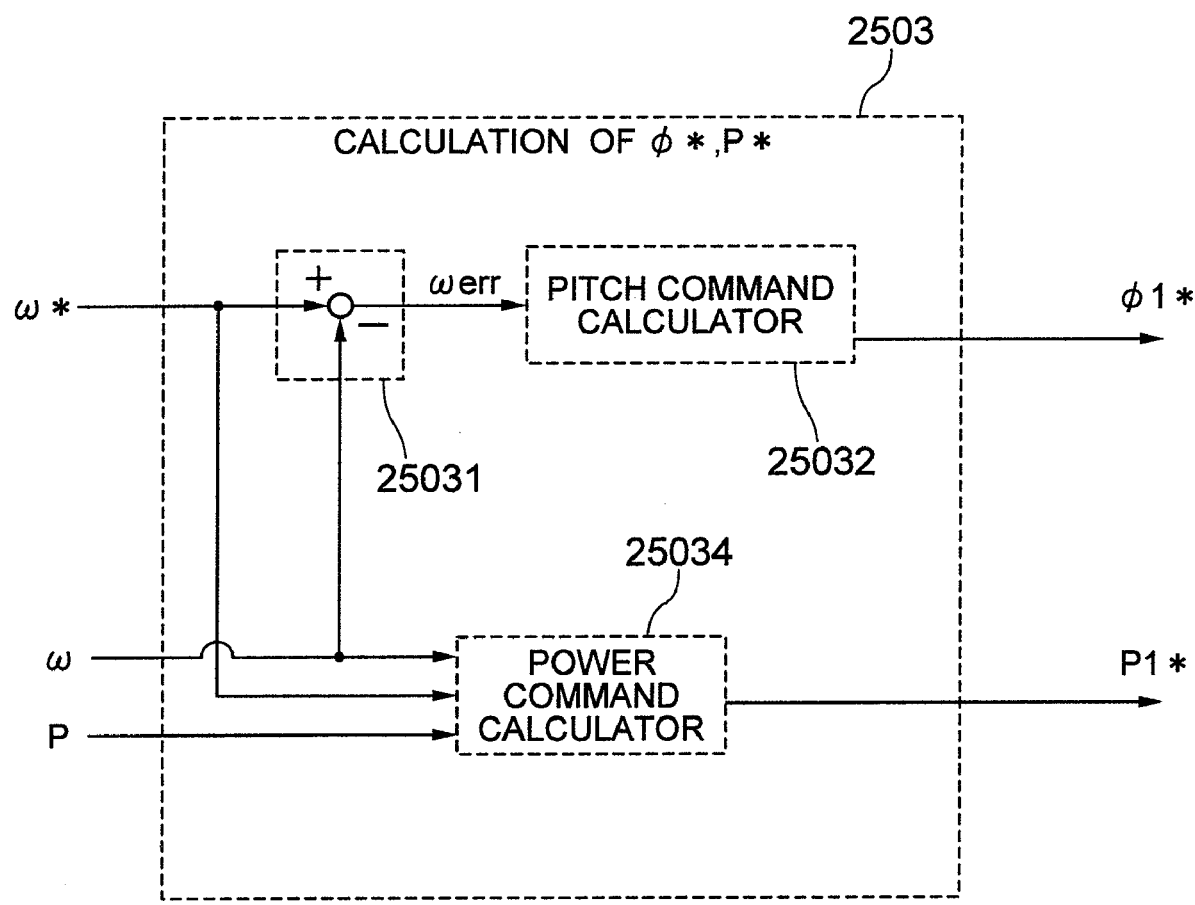
FIG. 6 shows in block diagram a process of generating the pitch command and the power command in the normal power generating operation.

FIG. 6 shows in block diagram a detailed process of generating the pitch command $\phi^*$ [degree] and the power command P* [W] in the normal power generating operation. A pitch command calculator 25032 generates pitch command $\phi_1^*$ (=$\phi^*$) on the basis of the rotational speed command ω* and the detected rotational speed ω. Simultaneously, a power command calculator 25034 generates power command $P_1^*$ (=P*) on the basis of the rotational speed command ω*, the detected rotational speed ω and the generated power P.

Description is made of the process of controlling the blade pitch in the event of an abnormality being detected. When an abnormal condition is detected, the wind power generation system stops the supply of generated power (P=0) for the power distribution grid 6. Accordingly, as apparent from the expression (10), it becomes hard to control the rotational speed by the control of the generated power P. Therefore, there is need for a special control because the now available rotational speed control must depend on a control relying on the pitch control that is relatively slow in response. Such an abnormality as described above includes, for example, an excessive fall or rise of the power grid voltage, excessive current through the power converter, and the large fluctuation of the power grid frequency.

The event of an excessive grid voltage fall will first be described. In a power distribution grid, a short-time fall of the grid voltage may be caused due to, for example, thunderbolts, the contacts of power transmission line with trees, the failure of loads, and the man-made short circuiting between the different phase conductors of power transmission lines. If this kind of abnormality, i.e. low voltage event, is a light failure, it can often be eliminated in several seconds by disconnecting the failure region from the grid.

The event of an excessive grid voltage rise will be described next. Such an abnormal event may be caused, for example, due to the inrush current generated momentarily when a load or a generator is connected with the power grid.

When such a transient fall or rise of the grid voltage occurs, the wind power generation system stops its operation of power generation. This is for the purpose of protecting the components of the wind power generation system.

The detection of an abnormal voltage is performed in the power converter controller 26 for controlling the power converter 28. The mechanism for detecting such an abnormal voltage is described in reference to FIG. 7. The power converter controller 26 incorporates therein a voltage amplitude calculator 2602 which performs such a calculation based on the above given expressions (2) and (5) to obtain the power grid voltage amplitude $V_{abs}$. The power converter controller 26 holds therein a voltage level $V_{GF}$ depending on which the decision that a failure has occurred in the power grid is made, and continuously compares the voltage level $V_{GF}$ with the calculated grid voltage amplitude $V_{abs}$ during the operation of the wind power generation system. A comparator 2604 in the power converter controller 26 performs such a comparison operation, makes a decision that the grid voltage is abnormal if $V_{abs}<V_{GF}$, and issues a signal indicating that an abnormally low voltage has been detected. The detection of an abnormally high voltage that has occurred in the power grid is performed according to a similar mechanism. The power converter controller 26 holds therein an over voltage level $V_{OV}$, and continuously compares $V_{OV}$ with $V_{abs}$. If the condition that $V_{OV}<V_{abs}$ is reached, decision is made that the grid voltage is abnormally high, whereby a signal indicating that an abnormally high voltage has been detected is issued.

Description will now be made of the case where the abnormality is an abnormally large current. In a wind power generation system, while it is operating under the normal power generating condition, the output current will not be greater than its rated current. However, when a failure occurs in the power grid, for example, an abnormally large current far greater than the rated current may flow in the wind power generation system. Such excessively large current will be hereafter referred to as "over current". When the amplitude of the over current reaches a value equal to 1.5~2 times as great as that of the rated current of the wind power generation system, there arises a risk that semiconductor elements serving as the components of the power converter 28 are damaged due to the over current. Therefore, when such over current is detected in the wind power generation system, it is necessary to stop the operation of the power converter 28 immediately and also to bring the wind power generation system as a whole into the standby mode. If such over current is caused due to a failure in the power grid that can be eliminated in a short time, the operation of the wind power generation system may preferably be resumed immediately after the level of the over current has started lowering, from the standpoint of stabilizing the power grid operation.

Figure 7:
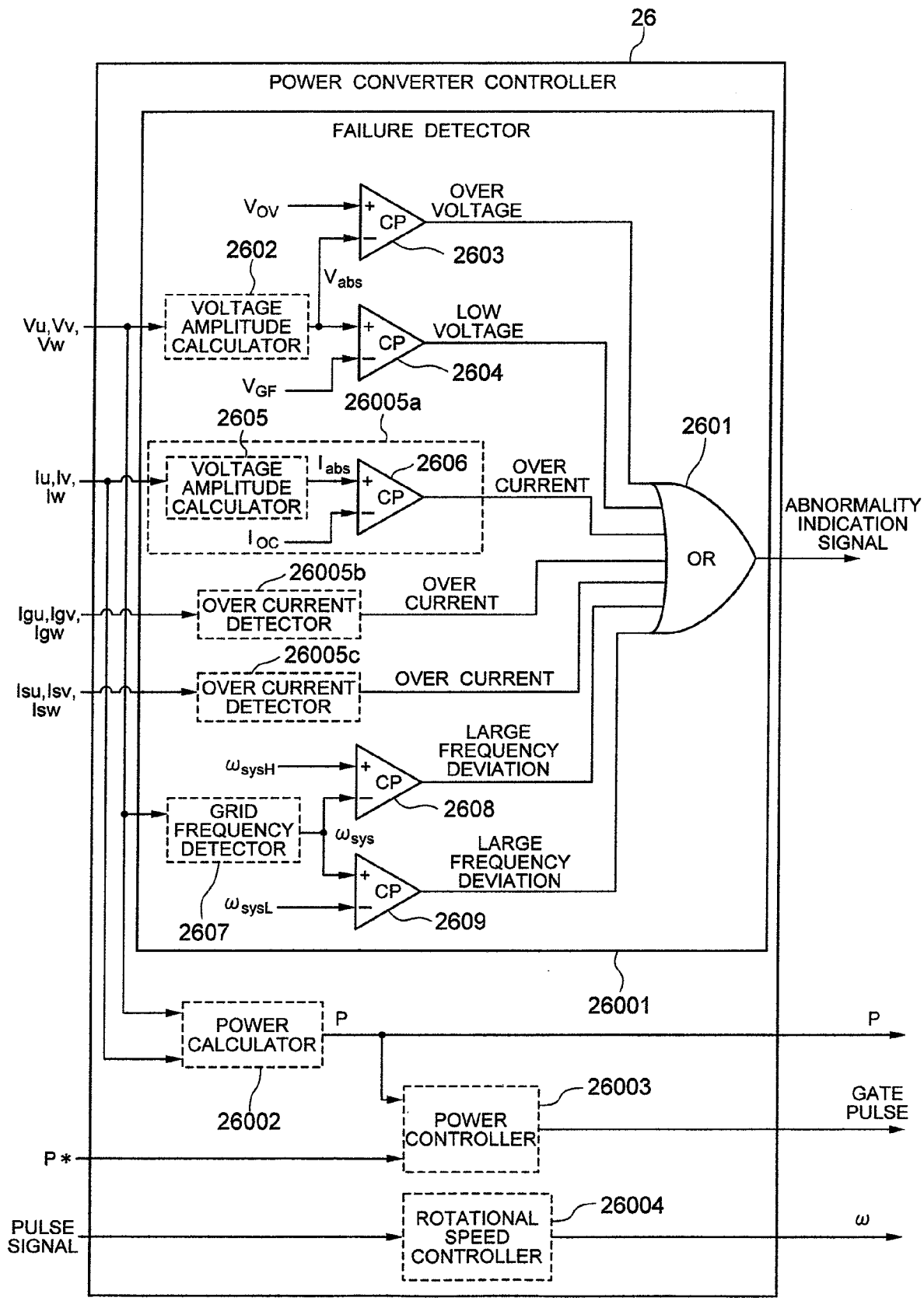
FIG. 7 shows in block diagram a mechanism for detecting an abnormal condition.

FIG. 7 is a block diagram for illustrating how the over current mentioned above is detected. Over current is detected by an over current detector 26005a included in the power converter controller 26. A current amplitude detector 2605 included in the over current detector 26005a performs the calculation represented by the expressions (1) and (6) given above, thereby obtaining the amplitude $I_{abs}$ of the output current. The power converter controller 26 holds therein a current amplitude level $I_{OC}$ depending on which the decision that over current has occurred is made. The current amplitude level $I_{OC}$ is usually set to a value that is 1.5~2 times as great as the rated current of the wind power generation system. A comparator 2606 in the power converter controller 26 continuously compares $I_{OC}$ with $I_{abs}$ during the operation of the wind power generation system. If the condition that $I_{OC}<I_{abs}$ is reached, decision is made that there is over current so that a signal indicating that the over current has been detected is issued. As described above, over current with respect to the output currents Iu, Iv and Iw of the wind power generation system is detected by the current detector 292. Over current through the power converter 28 is also detected by using a procedure similar to that used with the over current detector 26005a. For the grid-side power converter 283, over current is detected by an over current detector 26005b on the basis of the output currents $I_su$, $I_sv$ and $I_sw$ of the grid-side power converter 283 detected by the current detector 293. For the generator-side power converter 281, over current is detected by an over current detector 26005c on the basis of the output currents $I_gu$, $I_gv$ and $I_gw$ of the generator-side power converter 281 detected by the current detector 294.

A large fluctuation of the grid frequency is also an object of abnormality detection. The commercial frequency of a power grid is specific to thereto, and if the power grid is operating under the normal condition, its frequency will not deviate largely from the rated frequency. However, if there is a failure occurring in the power system, the operating frequency may deviate appreciably from the rated frequency. In such a case, the current control within a wind power generation system will very often become difficult and therefore the power generating operation will be stopped to protect the system from damage.

The mechanism of detecting the deviation of the grid frequency will be described below with reference to FIG. 7. The power converter controller 26 incorporates therein a grid frequency detector 2607 which detects the grid frequency $\omega_{sys}$ on the basis of the detected grid voltage signal. The power converter controller 26 holds therein an upper limit frequency $\omega_{sysH}$ and an lower limit frequency $\omega_{sysL}$. Comparators 2608 and 2609 continuously compare $\omega_{sys}$ with $\omega_{sysH}$ and $\omega_{sys}$ with $\omega_{sysL}$, respectively, during the operation of the wind power generation system. If the condition that $\omega_{sys} > \omega_{sysH}$, or $\omega_{sys} < \omega_{sysL}$ is reached, a signal indicating frequency deviation is issued.

Figure 8:
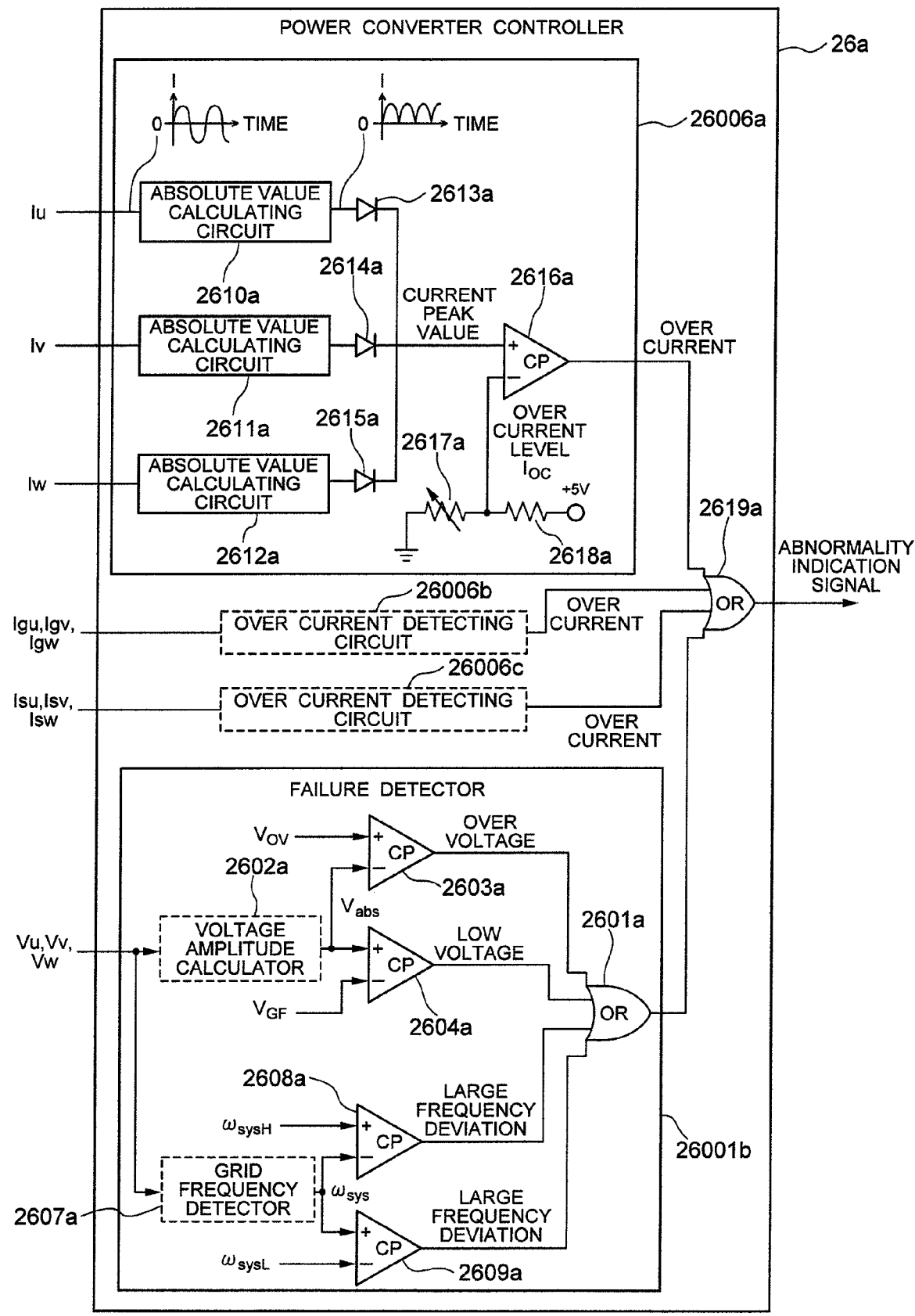
FIG. 8 shows in block diagram another mechanism for detecting an abnormal condition.

The procedure of detecting the abnormality of frequency as shown in FIG. 7 is performed through the calculation within the power converter controller 26, but the procedure for the same purpose may also be realized by electric circuitry as shown in FIG. 8. As shown in FIG. 8, over current is detected by an over current detecting circuit 26006a consisting mainly of absolute value calculating circuits 2610a, 2611a, 2612a and a comparator 2616a. The peak value of current is detected from the detected values of the three-phase currents Iu, Iv, Iw by the combinations of absolute value calculating circuit 2610a and diode 2613a, absolute value calculating circuit 2611a and diode 2614a, and absolute value calculating circuit 2612a and diode 2615a. Over current is detected by comparing the detected current peak value with an over current reference level $I_{oc}$ by means of the comparator 2616a. The over current reference level $I_{oc}$ is set by means of a 5V voltage source, a resistor 2618a and a variable resistor 2617a. Over current through the power converter 28 is also detected by over current detecting circuits 26006b and 26006b having the same circuit configuration as the over current detecting circuit 26006a. Over voltage as an abnormal phenomenon can also be detected by a similar electric circuit configuration that is not shown in FIG. 8, though.

When the power converter controller 26 detects at least one of the above mentioned signals indicating the abnormal current, voltage and frequency, it stops issuing the gate pulse signal which operates the power converter 28. This operation of discontinuing the gate pulse signal is referred to as "gate blocking". Simultaneous with the gate blocking, the abnormality indication signal is sent to the system controller 25. Upon receiving the abnormality indication signal, the system controller 25 brings the wind power generation system as a whole into the continuous operating mode under abnormal condition.

Description will now be made of the procedure for controlling the blade pitch in the continuous operating mode under abnormal condition according to this invention. In order for a wind power generation system to resume its power generating operation immediately after an abnormality is eliminated, it is necessary to maintain the rotational speed of the rotor 1 within the range in which power generation is possible, even in the continuous operating mode under abnormal condition.

The rotational speed of the rotor 1 is controlled by controlling the blade pitch and the generate power. The pitch controller 111 shown in FIG. 3 controls the pitch of the blades 11. The pitch controller 111 consists mainly of an electric motor or a mechanism driven by oil pressure. The pitch control for completing the rotation of the blades 11 from the feather state ($\phi = 0$ degree) to the maximum angle ($\phi = 30$ degrees) requires time about several tens of seconds. On the other hand, the control of generated power from zero level to the rated value requires several hundreds of milliseconds. In the control of the rotational speed, therefore, the power generation control is faster in response than the pitch control.

In the continuous operating mode under abnormal condition, entered into after an abnormality has been detected, the wind power generation system stops its operation, thereby discontinuing power supply to the grid. At this time, the term of the generated power vanishes (i.e. P=0) in the expression (10) so that only available means for controlling the rotational speed is the pitch control having low response. With an ordinary pitch control, the rotational speed may easily run off the operable range. Specifically, when an abnormality is detected while the wind power generation system is at its rated operation, the term P in the expression (10) rapidly falls from the rated power to 0 [W]. As a result of this, the rotational speed $\omega$ rises steeply. In order to suppress such steep rise of the rotational speed $\omega$, it is necessary to devise a pitch control procedure different from the pitch control procedure available in the normal power generating operation.

Figure 9:
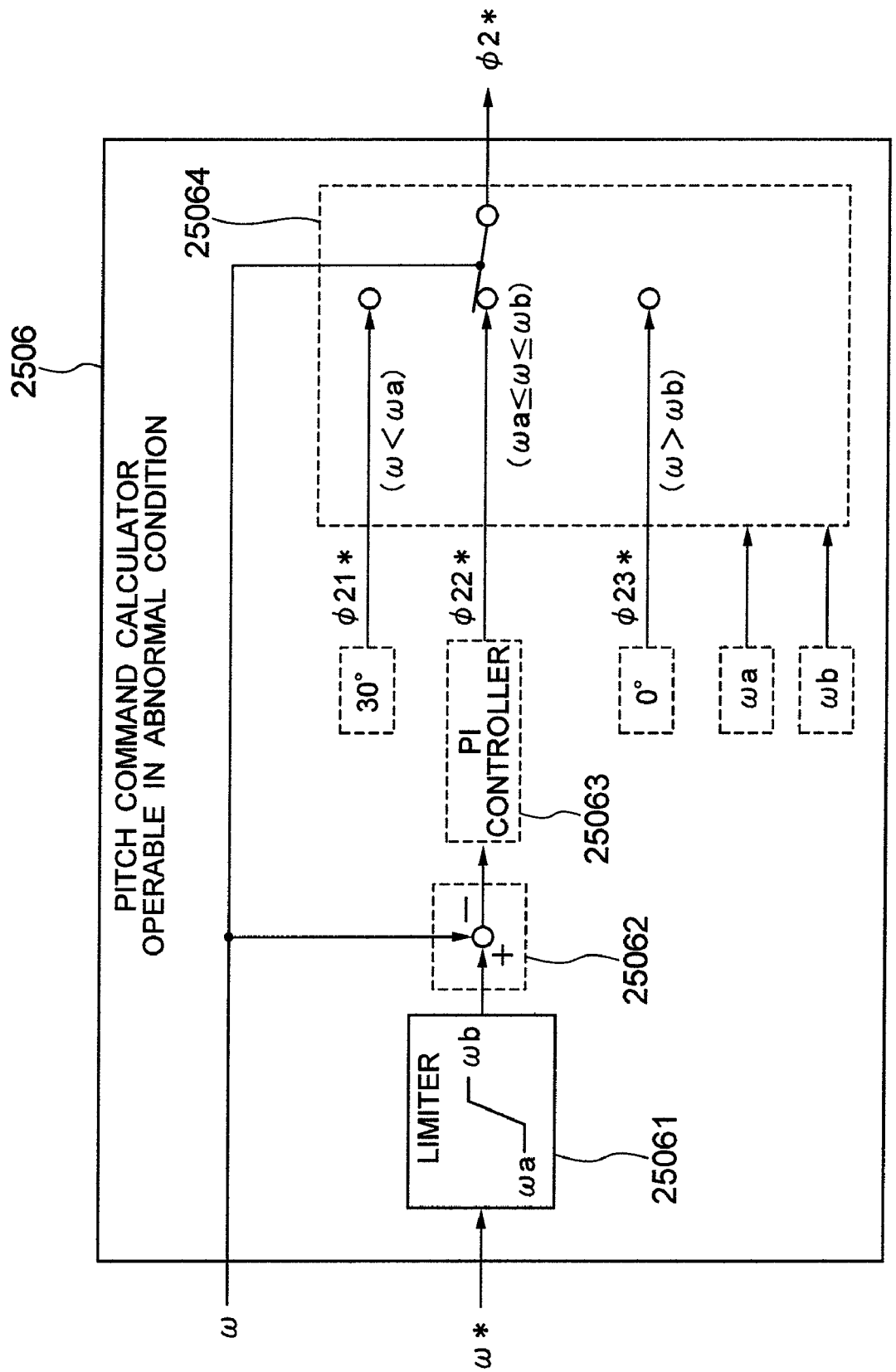
FIG. 9 schematically shows a method for generating a pitch command in the continuous operating mode under abnormal condition.

FIG. 9 schematically shows an example of a pitch control mechanism usable in the continuous operating mode under abnormal condition ensuing after an abnormality has been detected. In the continuous operating mode under abnormal condition, pitch control procedures are switched in accordance with the detected value $\omega$ of the rotational speed. To be concrete, there are provided two levels $\omega_a$ and $\omega_b$ of rotational speeds, and the pitch control procedures are switched over by comparing the actual rotational speed $\omega$ with these levels $\omega_a$ and $\omega_b$. The upper limit $\omega_H$ and the lower limit $\omega_L$ of operable rotational speeds are related to the two levels $\omega_a$ and $\omega_b$ as represented by the following expression (11).

$$\omega_L < \omega_a < \omega_b < \omega_H \quad (11)$$

If the detected value $\omega$ of rotational speed is such that $\omega_a \leq \omega \leq \omega_b$, the pitch control is performed by means of a PI controller 25063. The PI controller 25063 determines the pitch command $\phi_z^*$ ($=\phi^*$) by calculating the difference between the target value $\omega^*$ of rotational speed and the detected value $\omega$ of rotational speed through proportional-integral operation. When $\omega < \omega_a$, a pitch command selector 25064 selects the pitch command $\phi_z^* = 30$ degrees, at which the wind imparts the maximum energy to the blades 11. When $\omega > \omega_b$, the pitch command selector 25064 selects the pitch command $\phi_z^* = 0$ degree, at which the wind imparts the minimum energy to the blades 11.

Figure 10:
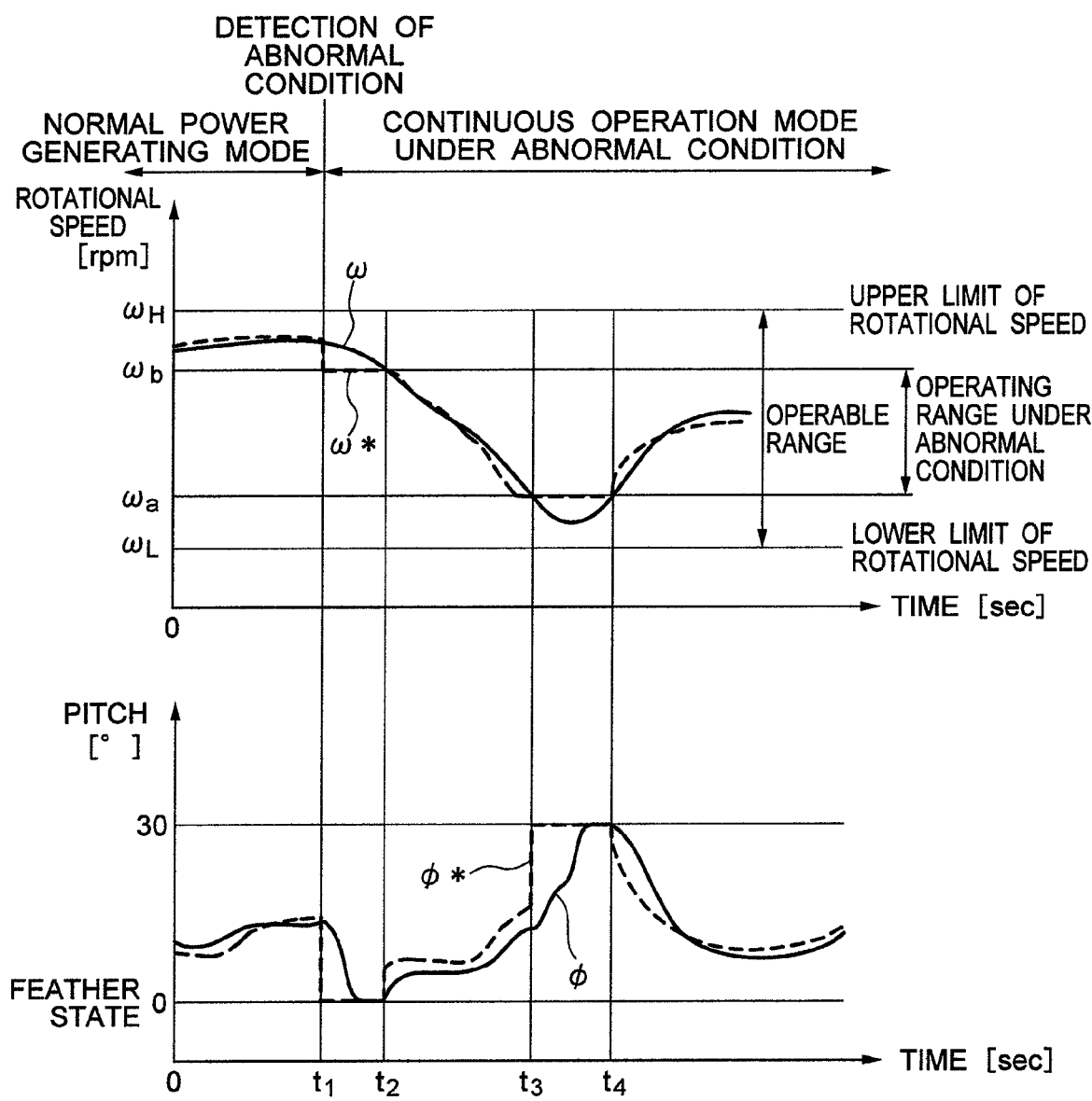
FIG. 10 graphically shows an example of the change with time in rotational speed and pitch in the continuous operating mode under abnormal condition.

FIG. 10 graphically shows the change with time in rotational speed and pitch. In FIG. 10, an abnormality is detected at time instant $t_1$, power generation is stopped at that instant, and the continuous operation mode under abnormal condition is entered into thereafter. At the instant $t_1$ of abnormality detection, since the rotational speed is such that $\omega > \omega_b$, the pitch command $\phi^* = 0$ degree is selected. By doing this, the wind energy can be rapidly attenuated when the rotational speed approaches the upper limit of the operable range of rotational speeds. Accordingly, the rotational speed can be lowered and therefore prevented from exceeding the upper value $\omega_H$ of rotational speed. For $t_2 < t < t_3$, it follows that $\omega_a < \omega < \omega_b$, and the PI controller issues the pitch command.

For $t_3<t<t_4$, it follows that $\omega<\omega_a$, and the rotational speed tends to reach its lower limit. Under this condition, the pitch command $\phi^*=30$ degrees is selected. Consequently, since the wind energy input can be increased rapidly, the rotational speed increases so that the rotational speed $\omega$ can be prevented from falling below the lower limit $\omega_L$.

Figure 11:
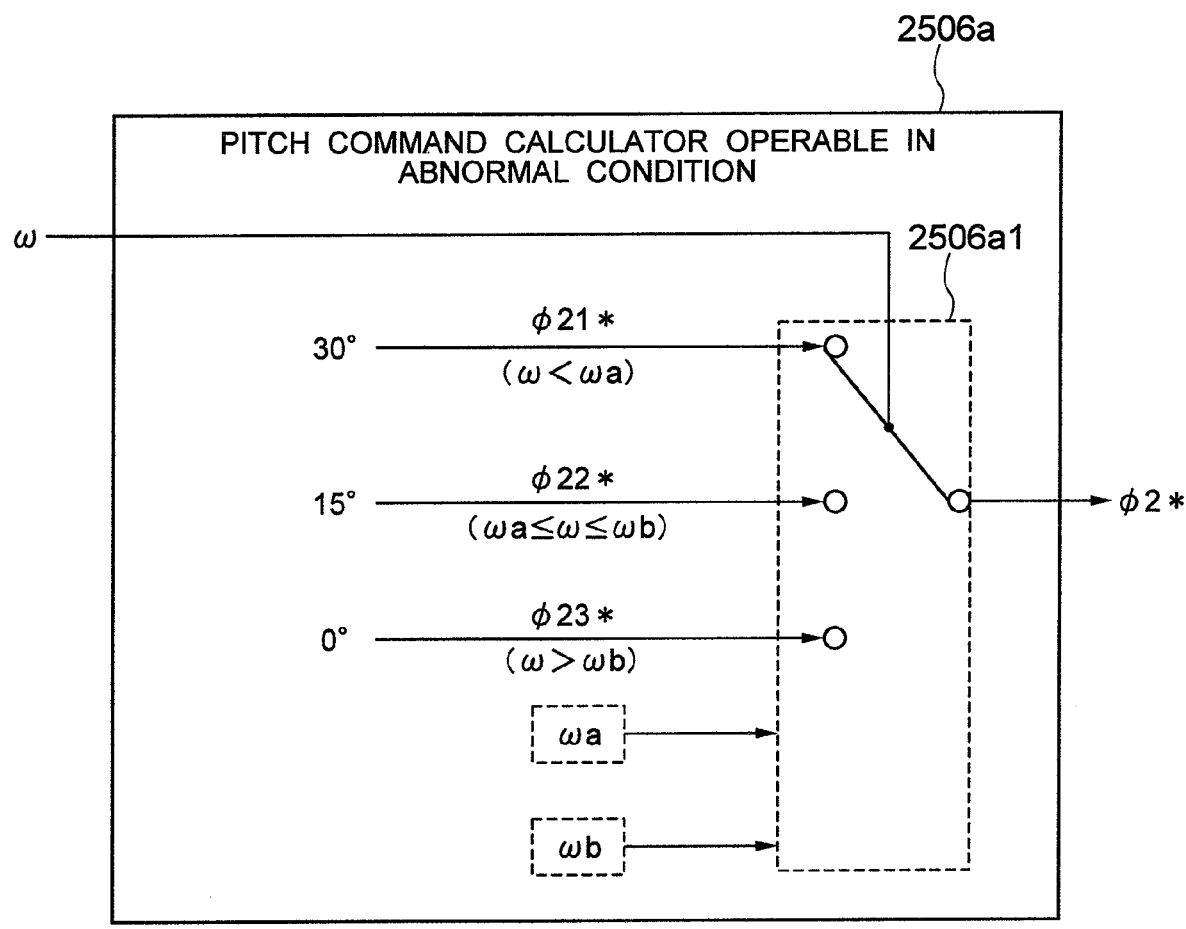
FIG. 11 schematically shows another method for generating a pitch command in the continuous operating mode under abnormal condition.

FIG. 11 schematically shows another example of a pitch control mechanism usable in the continuous operating mode under abnormal condition. In the procedure shown in FIG. 11, a predetermined pitch command is selected in accordance with the detected value $\omega$ of rotational speed in the continuous operation mode under abnormal condition. To be concrete, the pitch command $\phi^*=30$ degrees is selected for $\omega<\omega_a$, $\phi^*=15$ degrees for $\omega_a \leq \omega \leq \omega_b$, and $\phi^*=0$ degree for $\omega>\omega_b$.

Figure 12:
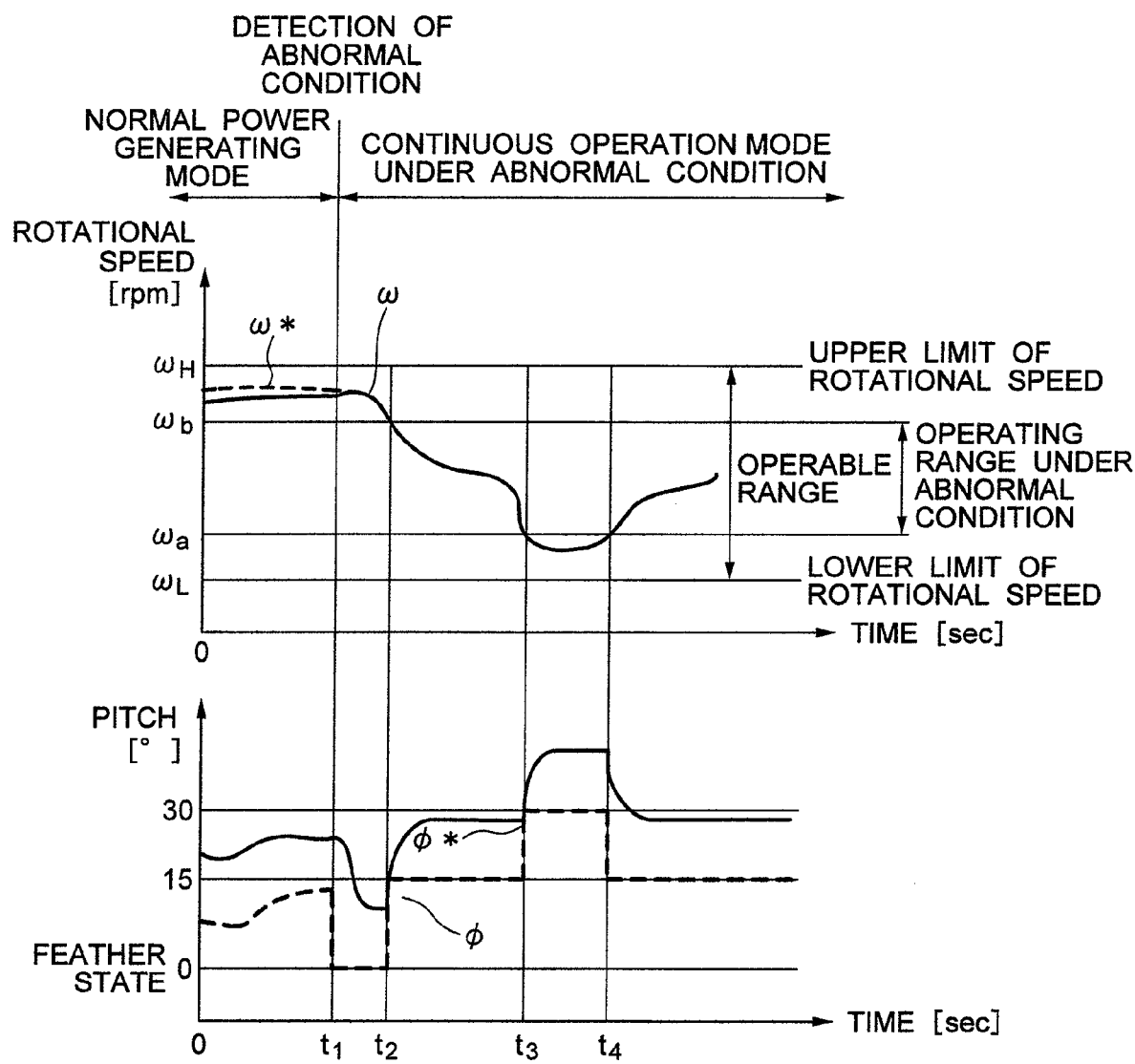
FIG. 12 graphically shows another example of the change with time in rotational speed and pitch in the continuous operating mode under abnormal condition.

FIG. 12 graphically shows the change with time in rotational speed and pitch, observed in the pitch control procedure shown in FIG. 11. As shown in FIG. 12, an abnormal condition is detected at an instant $t_1$, power generation is stopped at that instant, and the continuous operation mode under abnormal condition ensues thereafter. During the continuous operation mode under abnormal condition, three levels of pitch commands are selected in accordance with the magnitude of the rotational speed. For $t_1<t<t_2$, it follows that $\omega>\omega_b$, where the rotational speed is near the upper limit. Then, if the pitch command $\phi^*=0$ degree is selected, the wind energy input is attenuated so that the rotational speed can be prevented from rising above the upper limit. On the other hand, for $t_3<t<t_4$, it follows that $\omega<\omega_a$. Accordingly, the rotational speed approaches the lower limit and the pitch command $\phi^*=30$ degrees is selected. Thus, the wind energy input is increased to prevent the rotational speed from falling below the lover limit.

Figure 13:
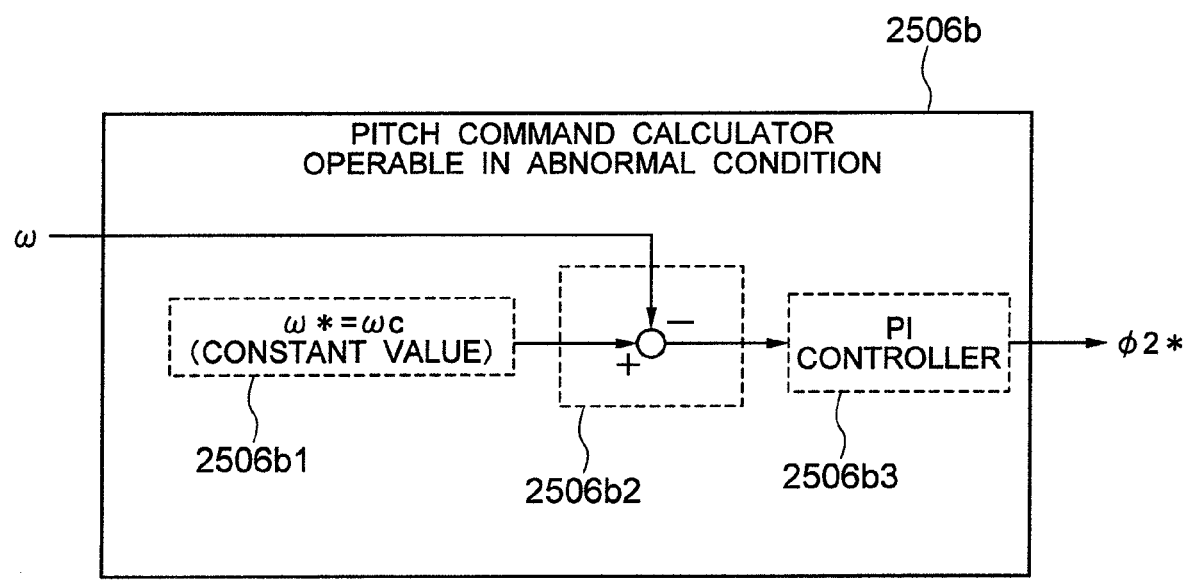
FIG. 13 schematically shows still another method for generating a pitch command in the continuous operating mode under abnormal condition.

FIG. 13 schematically shows still another example of a pitch control mechanism usable in the continuous operating mode under abnormal condition. According to the pitch control shown in FIG. 13, the value of the rotational speed command $\omega^*$ is fixed to a constant value $\omega_c$ irrespective of the wind velocity during the continuous operation mode under abnormal condition. The constant value $\omega_c$ is set near the middle point between the upper and lower limits $\omega_H$ and $\omega_L$ of the available rotational speeds. The pitch command $\phi_2$ is generated by applying PI operation to the difference between the constant value $\omega_c$ and the detected value $\omega$ of the rotational speed.

Figure 14:
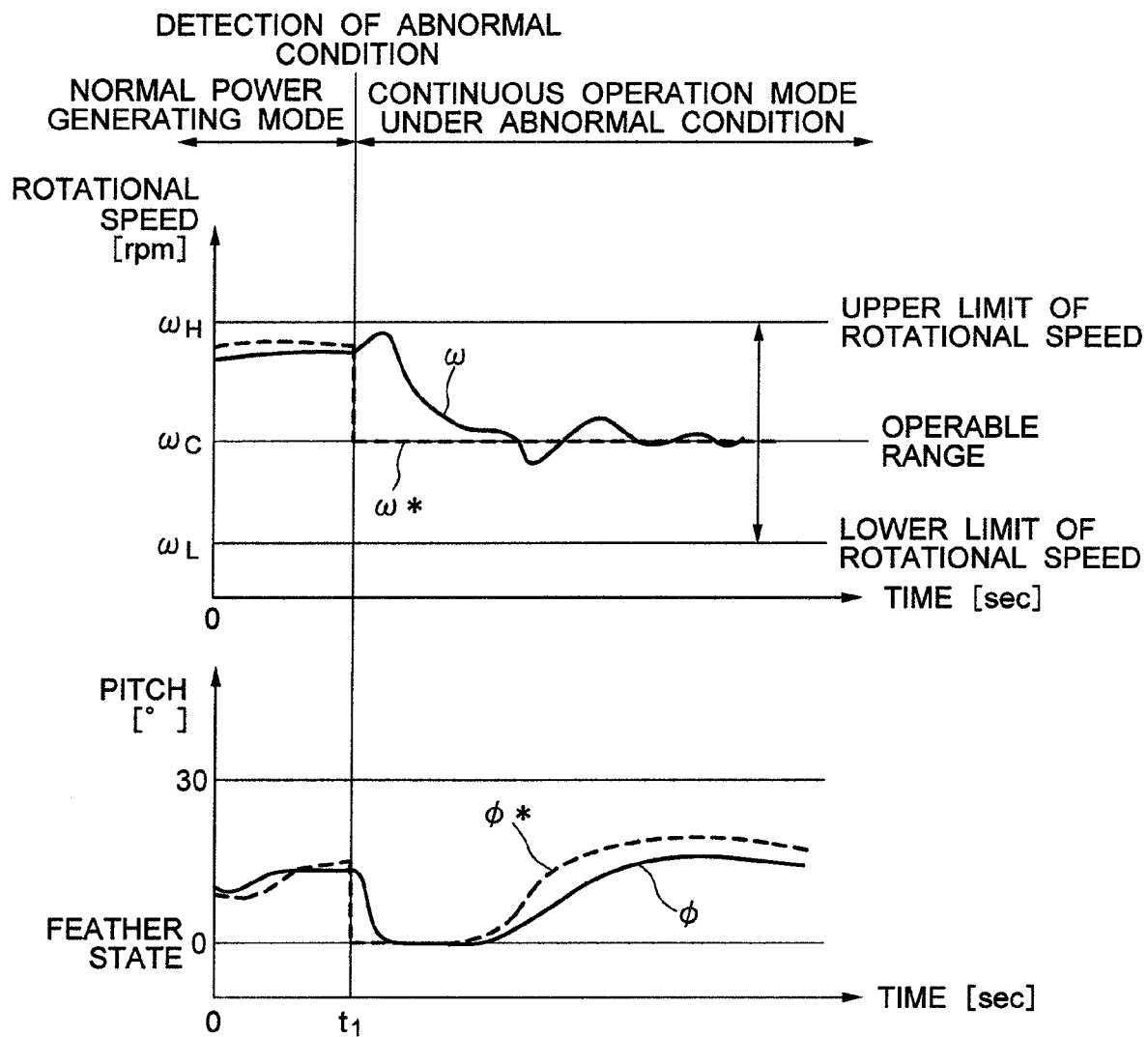
FIG. 14 graphically shows still another example of the change with time in rotational speed and pitch in the continuous operating mode under abnormal condition.

FIG. 14 graphically shows the change with time in rotational speed and pitch, observed in the pitch control procedure shown in FIG. 13. As shown in FIG. 14, an abnormal condition is detected at an instant $t_1$, power generation is stopped at that instant, and the continuous operation mode under abnormal condition ensues thereafter. The target rotational speed $\omega^*$ becomes constant irrespective of the wind velocity during the continuous operation mode under abnormal condition. Consequently, it hardly occurs that the rotational speed of the rotor 1 runs off the operable range. In the foregoing descriptions of the examples of pitch control mechanisms, the blade pitch is fixed to the feather state (pitch $\phi=0$ degree) in the region where the rotational speed is relatively high. However, the same result that the rotor 1 can be prevented from being excessively accelerated, can also be obtained by fixedly maintaining the blade pitch at any angle near the feather state.

In the event of low voltage described above, that is, when the power grid voltage falls abnormally, the power for the control devices in the wind power generation system cannot be supplied from the power grid.

Figure 15:
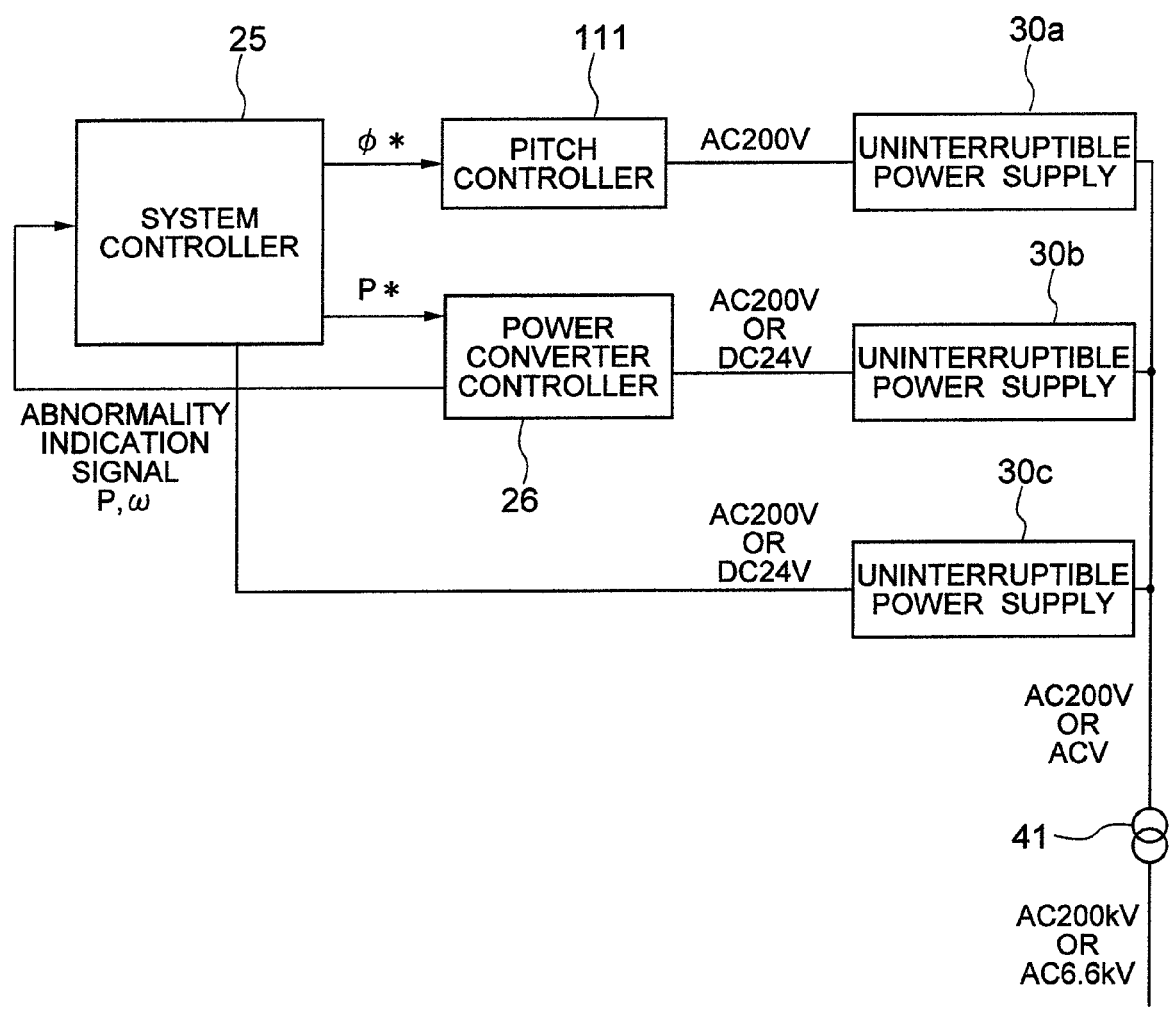
FIG. 15 shows in block diagram controllers and associated uninterruptible power supplies, constituting the control section of a wind power generation system.

FIG. 15 schematically shows an example wherein the controllers (system controller 25, pitch controller 111, power converter controller 26, etc.) incorporated in the wind power generation system are provided with individually associated uninterruptible power supplies 30a-30c. When the power grid is not suffering an abnormal voltage fall, the power for feeding those controllers are supplied after the grid AC voltage of 6.6 kV (or 1.4 kV) is stepped down to AC 200V (or 400V) and after being passed through the uninterruptible power supplies 30a-30c. The uninterruptible power supplies 30a-30c incorporate therein electricity storage devices such as, for example, batteries, and while the power grid is not suffering an abnormal voltage fall, they supply power to the controllers from the power grid and simultaneously charge their electricity storage devices.

When it becomes impossible to supply power to the controllers (system controller 25, pitch controller 111, power converter controller 26, etc.) from the power grid due to an abnormal voltage fall occurring in the grid, the uninterruptible power supplies 30a-30c supply power to the controllers from their battery system. With these uninterruptible power supplies, power can be securely supplied to the controllers even when the grid voltage becomes abnormally low, so that control operation can be maintained during the continuous operation mode under abnormal condition.

Figure 16:
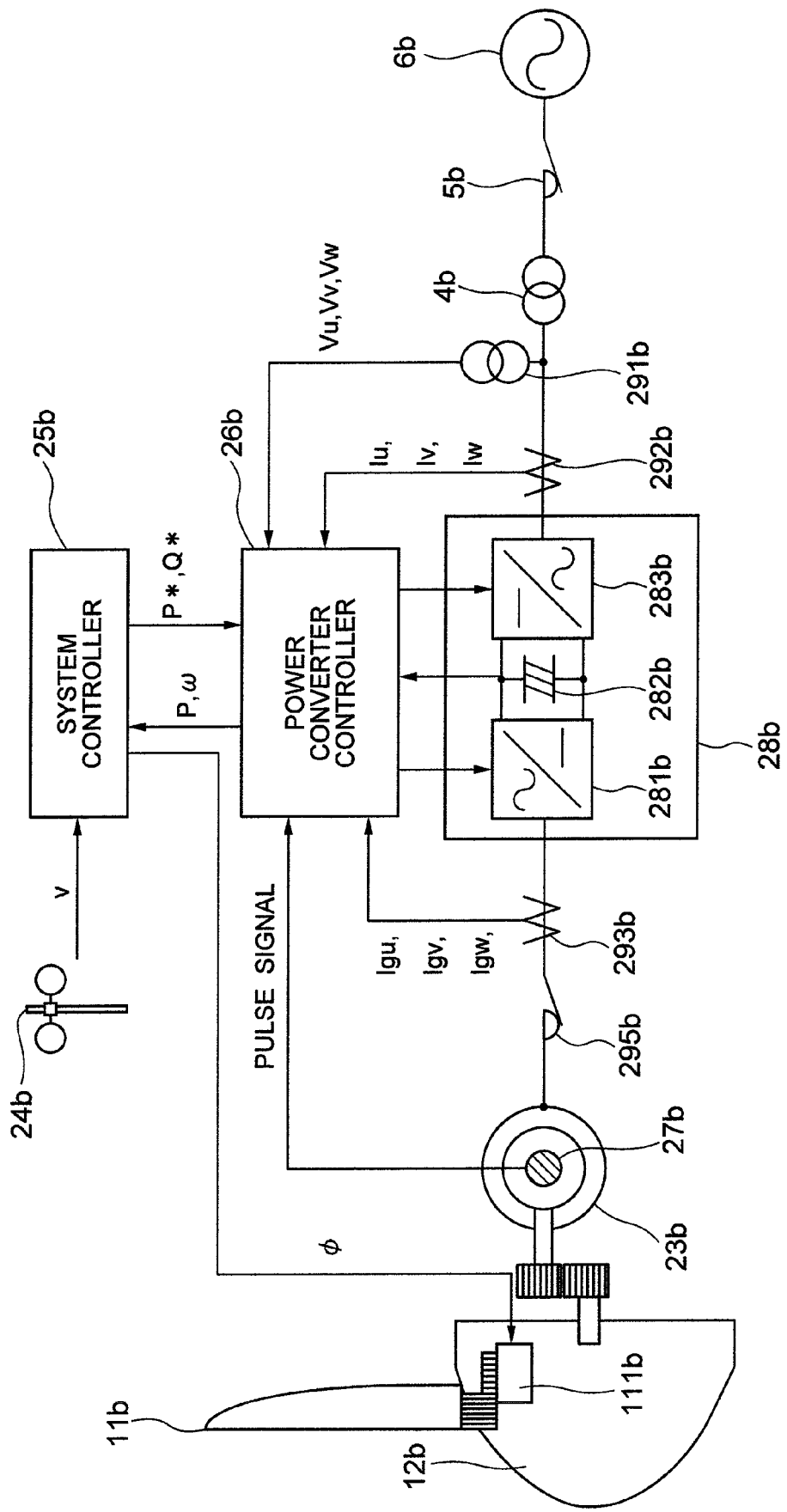
FIG. 16 schematically shows the overall configuration of another type wind power generation system incorporating therein a permanent magnet generator or an induction generator according to an embodiment of the present invention.
Figure 17:
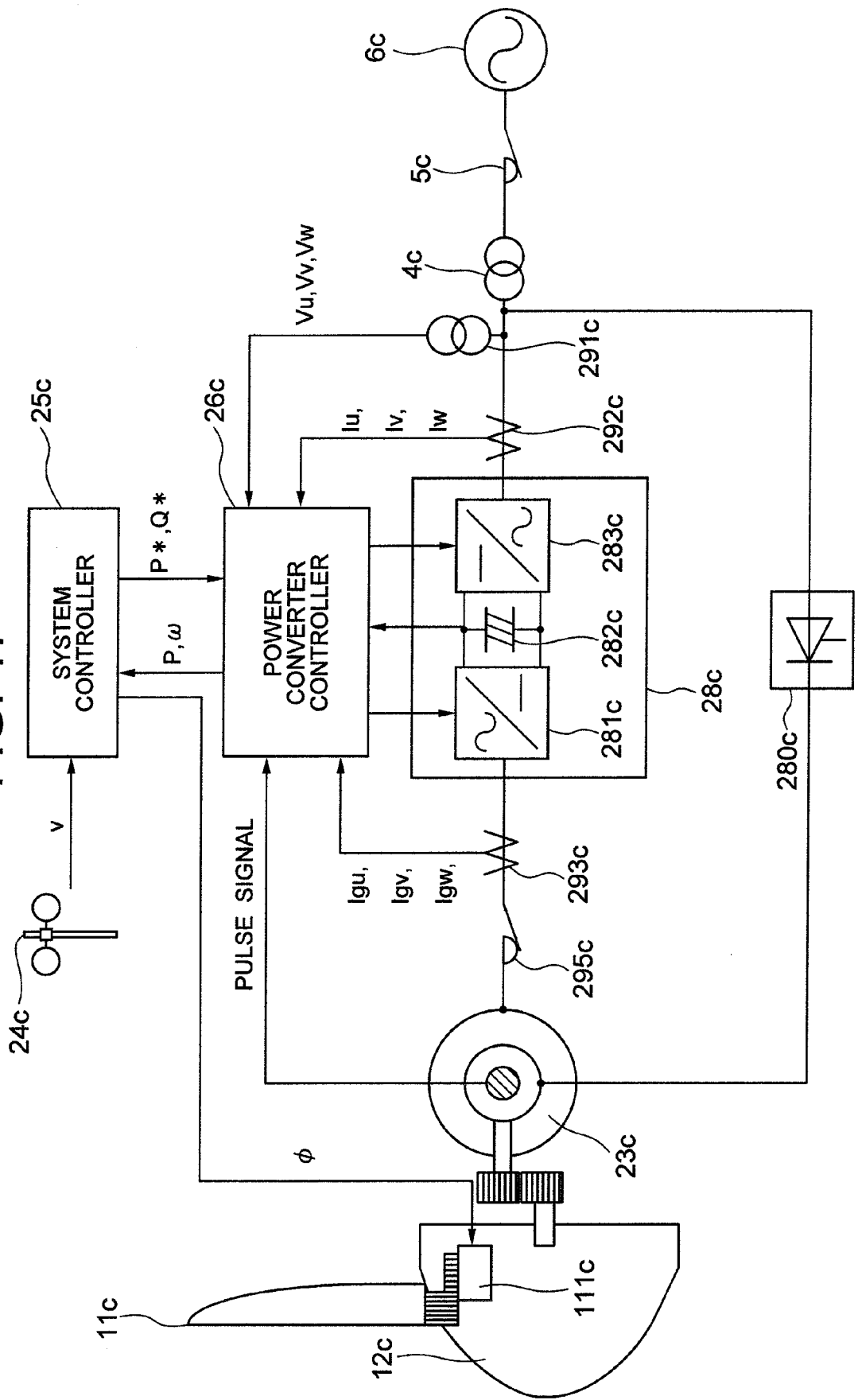
FIG. 17 schematically shows the overall configuration of a wind power generation system incorporating therein a DC excitation synchronous generator according to an embodiment of the present invention.

The above described pitch control procedure for use in the continuous operation mode under abnormal condition can be applied not only to the wind power generation system using a doubly fed induction generator but also to the wind power generation system using a permanent magnet generator or an induction generator as shown in FIG. 16, or a DC excitation synchronous generator as shown in FIG. 17.

As described above, when is entered into after an abnormal condition has been detected, the pitch control procedure is changed from its normal operating mode under normal condition to its emergency mode under abnormal condition, and the pitch command is switched according to the rotational speed of the wind turbine, or the pitch command is properly adjusted so as to set the rotational speed to a target value. According to this pitch control procedure, the rotational speed of the rotor 1 can be confined within the operable range even in the continuous operation mode under abnormal condition where the rotational speed of the rotor 1 must be controlled only through the adjustment of the blade pitch. Thus, immediately after the abnormal condition has been eliminated, the normal power generating operation can be resumed quickly. Hence, the effective operating time of the wind power generation system can be prolonged with the result that the quantity of generated power is increased. Further, this pitch control procedure enables the immediate supply of power after a grid failure and therefore contributes much to the stabilization of the power grid as a whole.

Embodiment 2

The second embodiment of this invention will now be described. In this embodiment, the pitch control procedure is changed in accordance with the rate of decrease in the grid voltage.

This embodiment can be applied to such a wind power generation system as shown in FIGS. 1 and 2, which has a power converter 28 as a constituent part and which can control the generated power. Since the pitch control and the control of the generated power in the normal power generating operation according to this second embodiment are similar to those described with the foregoing first embodiment of this invention, their description is omitted here.

Described below is a control procedure used in a wind power generation system when a low voltage event occurs in a power grid connected with the system. In a power distribution grid, a short-time fall of the grid voltage may be caused due to, for example, thunderbolts, the contacts of power transmission line with trees, the failure of loads, and the man-made short circuiting between the different phase conductors of power transmission lines. If this kind of abnormality, i.e. low voltage event, is a light failure, it can often be eliminated in several seconds by disconnecting the failure region from the grid.

If the wind power generation system can supply power for the power grid even when the grid voltage is lowering, a merit can be enjoyed as described below. As apparent from the expression (10) given above, the rotational speed of the rotor 1 of the wind power generation system is determined depending mainly on the input power $P_{in}$ [W] of the wind and the power P [W] generated by the wind power generation system. In the case where the wind power generation system cannot supply power for the power grid since there is a failure in, for example, the power grid, the term P in the expression (10) vanishes, i.e. P=0. This causes a rapid increase in the rotational speed ω. If, on the contrary, power generated by the wind power generation system can be supplied for the power grid even in the event of a failure occurring in the grid, the degree of increase in the rotational speed ω can be mitigated. Thus, the amount of power supplied for the power grid changes the rate of increase in the rotational speed ω.

The relationship between the grid voltage and the generated power P will be described next. While the grid voltage is decreasing for a short time due to a failure, the grid voltage term $V_{abs}=|V_d|$ in the expression (9) decreases so that even though the same current $I_d$ as before the failure is caused to flow, the generated power P decreases. In order to maintain the level of generated power P at the same level as before the failure, the output current $I_d$ must be increased. However, there is a limit to the increase in the output current $I_d$ due to the restrictions imposed on the power converter and the generator. The maximum value $P_{MAX}$ [W] of the power generated by the wind power generation system is proportional to the grid voltage as given by the following expression (12), where the maximum value of the current outputted by the power converter 28 is denoted by $I_{MAX}$ [Arms].

$$P_{MAX} = I_{dMAX} \cdot V_d \propto V_{abs} \quad (12)$$

It is therefore necessary to change the pitch control procedure for preventing the increase in the rotational speed, in accordance with the rate of decrease in the grid voltage. For example, in case of a failure where the grid voltage reduces to zero, $V_d$ in the expression (7) is approximately zero so that the power P to be supplied to the power grid also becomes almost zero. Accordingly, to suppress the increase in the rotational speed, it is necessary to rapidly decrease the input power $P_{in}$ in the expression (10). Namely, it is necessary to bring the blade pitch parallel to the wind direction (feather direction).

On the other hand, when the grid voltage falls to at least 80% of the normal voltage, almost all power generated by the wind power generation system can be supplied for the power grid even in the low voltage event in the grid. Namely, the decrease in the generated power P in the expression (10) is small and the increase in the rotational speed is also mild. Since it is not necessary to rapidly decrease the input power $P_{in}$, the pitch control can be performed using the ordinary pitch control procedure as shown in FIG. 4, or it suffices to employ the pitch control for suppressing the excessive rotational speed only when the rotational speed exceeds the upper limit even in case where the wind velocity is such that $V_{ci}<v<v_r$.

Figure 18:
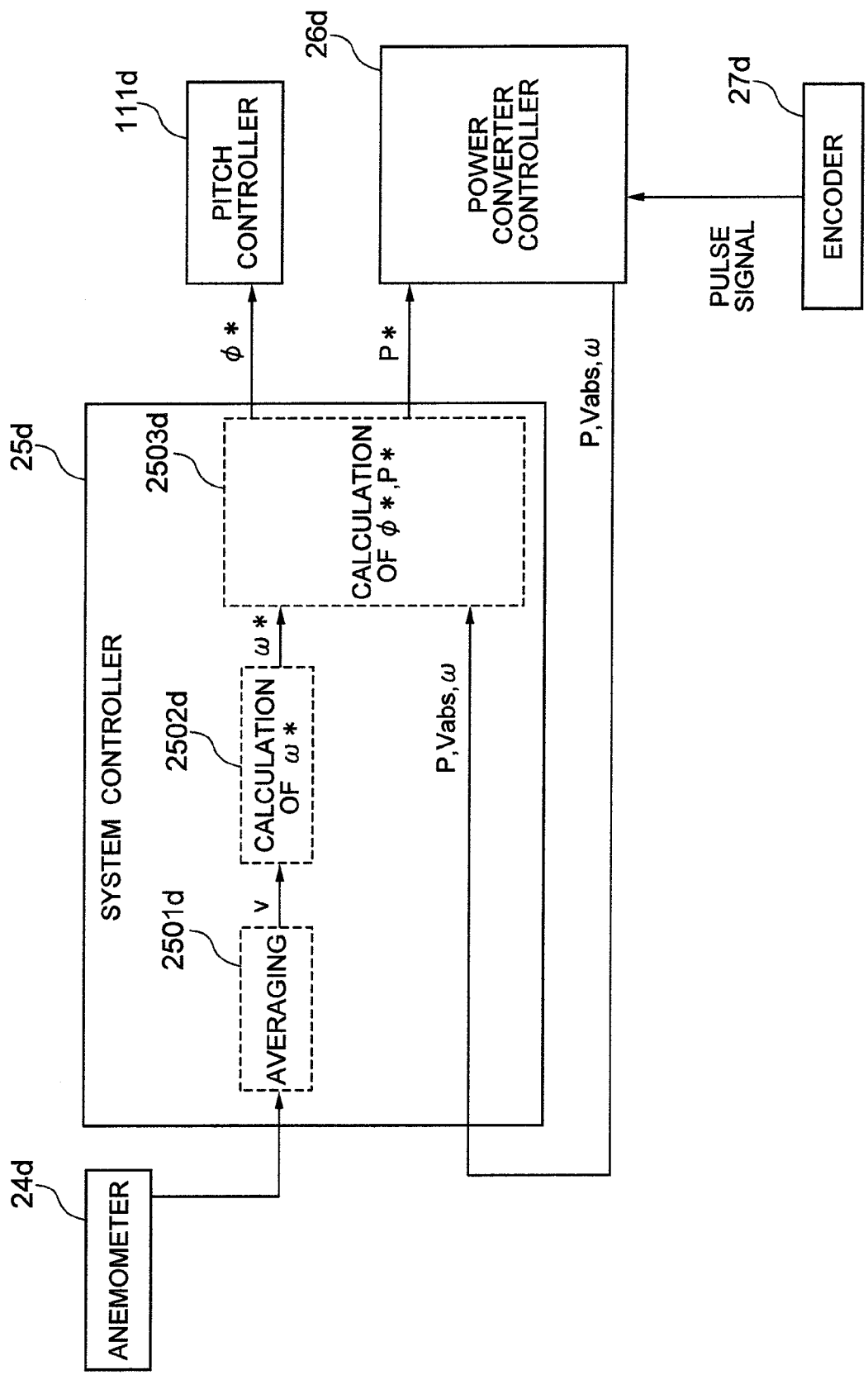
FIG. 18 schematically shows the configurations of pitch control and power control sections.

FIG. 18 schematically shows the configurations of pitch control and power control according to the second embodiment of this invention. In a system controller 25d, an average calculator 2501d calculates the time-average of the wind velocity measured by an anemometer 24d to obtain the average wind velocity v [m/sec]. A rotational speed command calculator 2502d generates the rotational speed command ω* corresponding to the average wind velocity v [m/sec] through table reference. A pitch/power command calculator 2503d calculates the pitch command φ* [degree] for the blade pitch and the power command P* on the basis of the obtained rotational speed command ω*, the detected rotational speed ω [rad/sec] of the rotor 1, the generated power P [W] and the grid voltage amplitude $V_{abs}$ [W]. A pitch controller 111d controls the pitch of the blades 11 in accordance with the pitch command φ* [degree] outputted from the system controller 25d.

Figure 19:
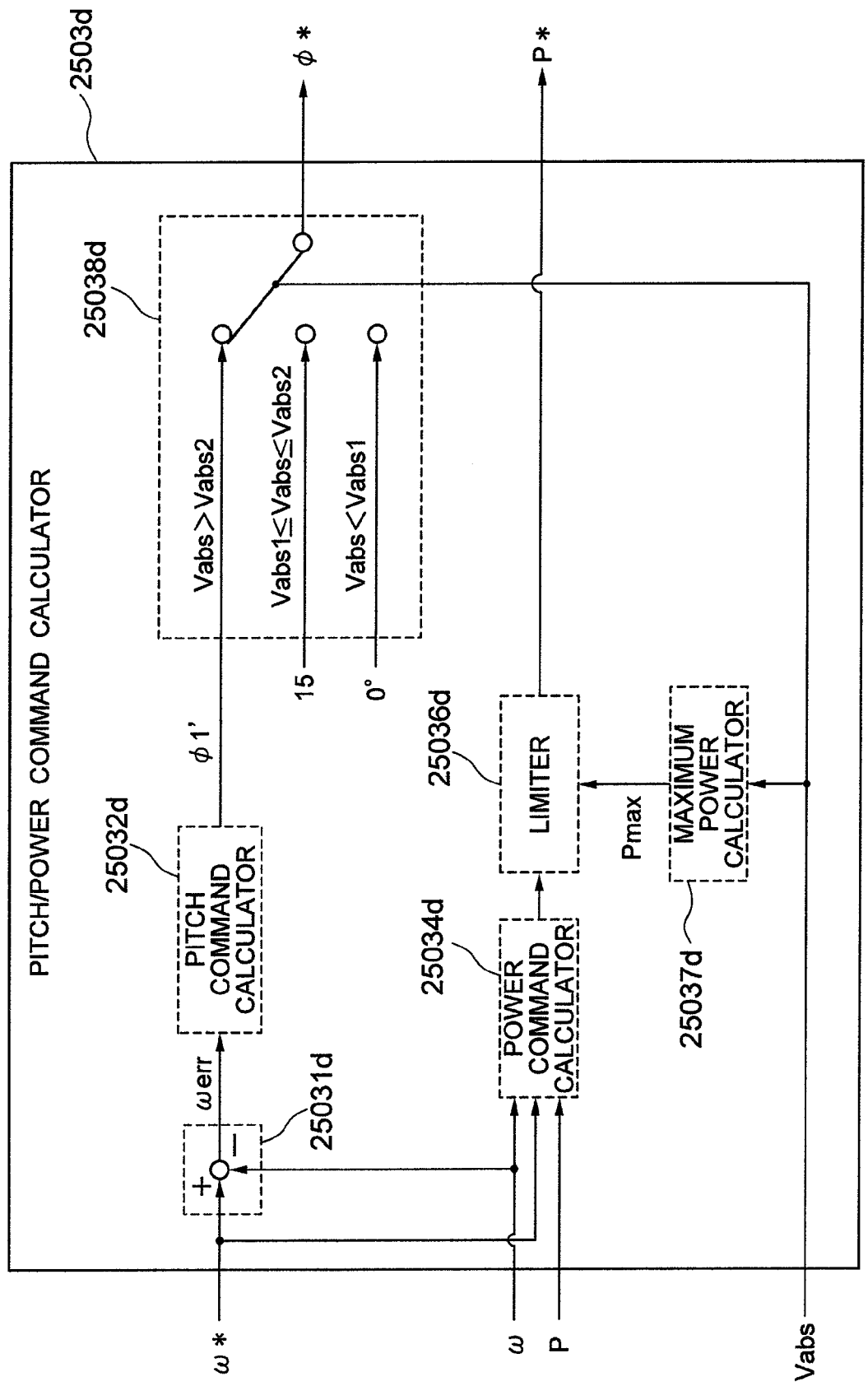
FIG. 19 schematically shows the configuration of the pitch/power command calculator used in the configuration shown in FIG. 18.

FIG. 19 schematically shows the configuration of the pitch/power command calculator 2503d used in the embodiment shown in FIG. 18. This pitch/power command calculator 2503d is characterized in that the pitch control procedure is switched in accordance with the degree of the decrease in the grid voltage. To be concrete, the grid voltages in the event of a failure occurring in the power grid are divided into three ranges, and a particular pitch control procedure is used for each range of the grid voltages. The grid voltage varies, depending on the standards of power distribution administrators, approximately between 90% and 110% of the rated voltage, i.e. grid voltage under normal condition. When the grid voltage is equal or less than 90% of the rated voltage, the power grid is deemed to be in the failure condition. Further, the time period during the event of failure is divided into three domains in accordance with the amplitude of the grid voltage.

For example, if the grid voltage is between $V_{GF}$ (=equal to 90% of the rated voltage) and $V_{abs2}$ (=80% of the rated voltage), which indicates that the grid is in the failure condition, then almost all the power generated by the wind power generation system can be supplied for the power grid so that the failure influence on the grid is very small, whereby there is little increase in the rotational speed. Hence, in this voltage range, the pitch control procedure to be employed in the normal operating condition is used wherein the pitch control is performed according to the wind velocity, and the pitch command is generated on the basis of ω and ω*.

If the grid voltage lies between $V_{abs2}$ (=80% of the rated voltage) and $V_{abs1}$ (=20% of the rated voltage), the blade pitch is turned rapidly to a predetermined angle φ=15 degree and fixed there. The predetermined pitch is set approximately at the middle point between the maximum pitch and the feather state. By performing this type of pitch control, part of the wind input energy is shunted to prevent the excessive rotational speed, maintain the rotation of the rotor 1 even in the failure condition, and enable the wind power generation system to resume its normal power generating operation immediately after the failure has been eliminated.

If the grid voltage falls below $V_{abs1}$ (=20% of the rated voltage), almost no power can be supplied from the wind power generation system to the power grid so that the rotational speed ω of the rotor 1 increases rapidly. To suppress the increase in the rotational speed, the pitch controller 111d rapidly pitches the blades to the feathered position (φ=0 degree). Regarding the power command P*, a maximum power calculator 25037d calculates the maximum power $P_{max}$ which can be generated according to the expression (7), and a limiter 25036d limits the value of the power command P* on the basis of the maximum power $P_{max}$.

Figure 20:
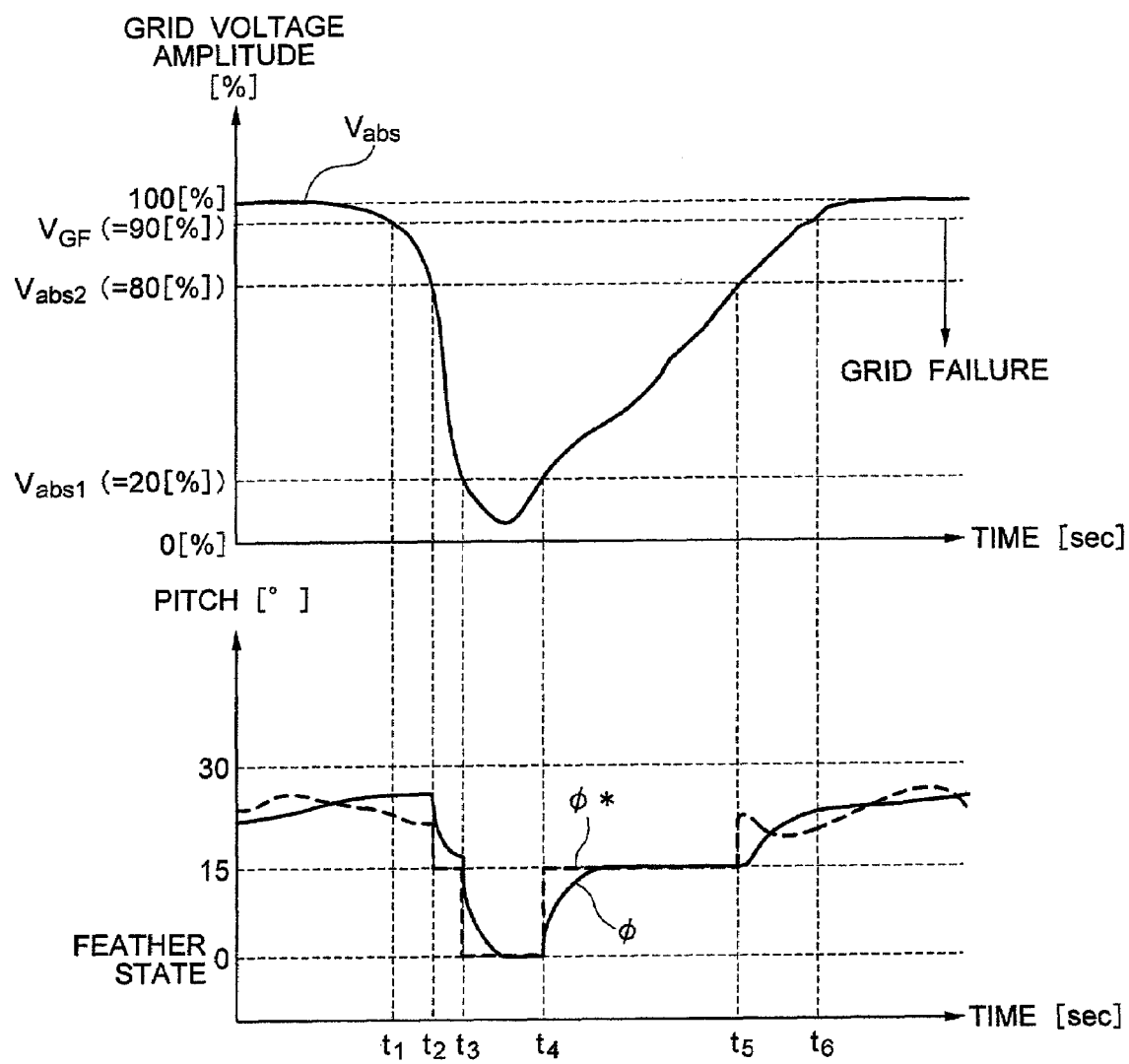
FIG. 20 graphically shows the variations with time of the grid voltage amplitude and the blade pitch when the grid voltage is in a low voltage event.

FIG. 20 graphically shows the variations with time of the grid voltage amplitude and the pitch command, observed according to the pitch control procedure as shown in FIGS. 18 and 19. In FIG. 20, the abscissas indicate time in second [sec], and the ordinates represent grid voltage amplitude in percent [%] and pitch command in degree [°] As shown in FIG. 20, the grid voltage amplitude $V_{abs}$ becomes such that $V_{abs}<V_{GF}$ at time $t_1$, but the pitch control to be performed is that procedure which controls the blade pitch in accordance with the rotational speed as in the normal power generating operation. During the time intervals $t_2<t<t_3$ and $t_4<t<t_5$, the grid voltage amplitude $V_{abs}$ becomes such that $V_{abs1}<V_{abs}<V_{abs2}$, and the pitch command φ* is fixed at 15 degrees (φ*=15°). In like manner, since $V_{abs}<V_{abs1}$ for $t_3<t<t_4$, the pitch command φ* is fixed at zero degree (φ*=0°). By performing this pitch control, it becomes easy to prevent the rotational speed from running off the operable range.

It is possible to use different values for $V_{GF}$, $V_{abs1}$ and $V_{abs2}$ depending on the power grid with which the wind power generation system is connected, the power supply capability of such a wind power generation system, and the characteristics of the wind power generation system. It is also possible to provide more than three reference levels for grid voltage amplitude and pitch command at which the pitch control procedure is switched.

Further, the pitch control procedure according to this invention can be applied to a wind power generation system using a doubly fed induction generator as shown in FIG. 3, a wind power generation system using a permanent magnet generator and an induction generator as shown in FIG. 16, and a wind power generation system using a DC excitation synchronous generator as shown in FIG. 17.

As described above, by choosing a pitch control procedure in accordance with the rate of decrease in the grid voltage, the excessive rotational speed of the rotor can be prevented even during a short-time grid failure where the grid voltage abnormally lowers. Accordingly, the wind power generation system can resume its power generating operation immediately after the failure has been eliminated. Hence, the effective operating time of the wind power generation system can be prolonged with the result that the quantity of generated power is increased. Further, this pitch control procedure enables the supply of power immediately after a grid failure and therefore contributes much to the stabilization of the power grid as a whole.

Embodiment 3

Figure 21:
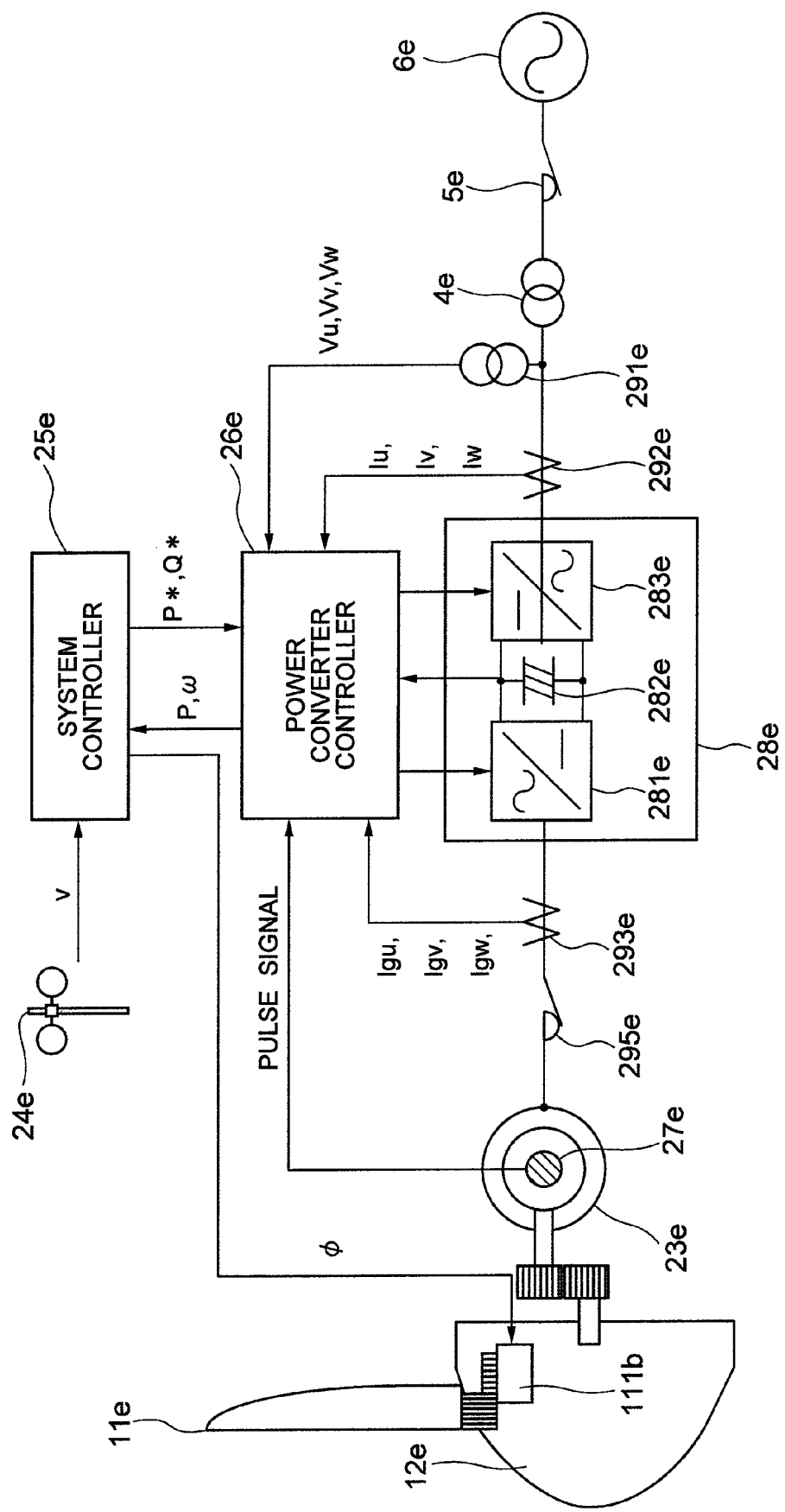
FIG. 21 schematically shows the overall configuration of still another type wind power generation system incorporating therein a permanent magnet generator according to an embodiment of the present invention.

The third embodiment of this invention will now be described with reference to FIGS. 21, 22, 23 and 24. FIG. 21 schematically shows the configuration of a wind power generation system using a permanent magnet generator, according to the third embodiment of the invention. The control section of the system consists mainly of a system controller 25e for controlling the entire system, and a power converter controller 26e for controlling a power converter 28e. The system controller 25e calculates power command and pitch command for blades 11e on the basis of the wind velocity measured by an anemometer 24e and the rotational speed ω [rad/sec] of the rotor 1.

The power generated by the wind power generation system is controlled by the power converter 28e. The power converter 28e consists mainly of a generator-side power converter 281e, a grid-side power converter 283e, and an intermediate (smoothing) capacitor 282e. The generator-side power converter 281e and the grid-side power converter 283e are both built by using semiconductor switching elements such as IGBTs. During the normal operation, the generator-side power converter 281e controls the generated power through active power control in accordance with the active power command P* issued from the system controller 25e. Simultaneously, the generator-side power converter 281e controls the terminal voltages of a permanent magnet generator 23e through reactive power control. The grid-side power converter 283e supplies power for the power grid through control of the DC voltage in the power converter 28e. Simultaneously, the grid-side power converter 283e also controls the reactive power supplied to the power grid.

The power converter controller 26e takes in the three-phase AC voltages Vu, Vv and Vw [V] and the three-phase AC currents Iu, Iv and Iw [A] by means of a voltage detector 291e and a current detector 292e, respectively, provided at the junction point of the wind power generation system and the power grid. The power converter controller 26e then calculates voltage amplitude $V_{abs}$ [Vrms], current amplitude $I_{abs}$ [Arms], active (generated) power P [W] and reactive power Q [Var] on the basis of the voltages and currents. To be concrete, the voltage amplitude $V_{abs}$ [Vrms] and the current amplitude $I_{abs}$ [Arms] are calculated by using the following expressions (13) and (14), respectively.

$$V_{abs} = \sqrt{\frac{1}{3}(V_u^2 + V_v^2 + V_w^2)} \tag{13}$$

$$I_{abs} = \sqrt{\frac{1}{3}(I_u^2 + I_v^2 + I_w^2)} \tag{14}$$

Further, the power converter controller 26e continuously compares the calculated current amplitude $I_{abs}$ [Arms] with the predetermined values $I_{CLR}$ and $I_{OC}$ held therein to detect the over current through the grid-side power converter 283e. The predetermined values $I_{CLR}$ and $I_{OC}$ are so chosen as to be represented by the following inequality (15).

$$I_{CLR}<\text{amplitude of the rated current}<I_{OC} \tag{15}$$

In the inequality (15), $I_{CLR}$ denotes the level at which over current event is released, and $I_{OC}$ indicates the over current level.

Figure 22:
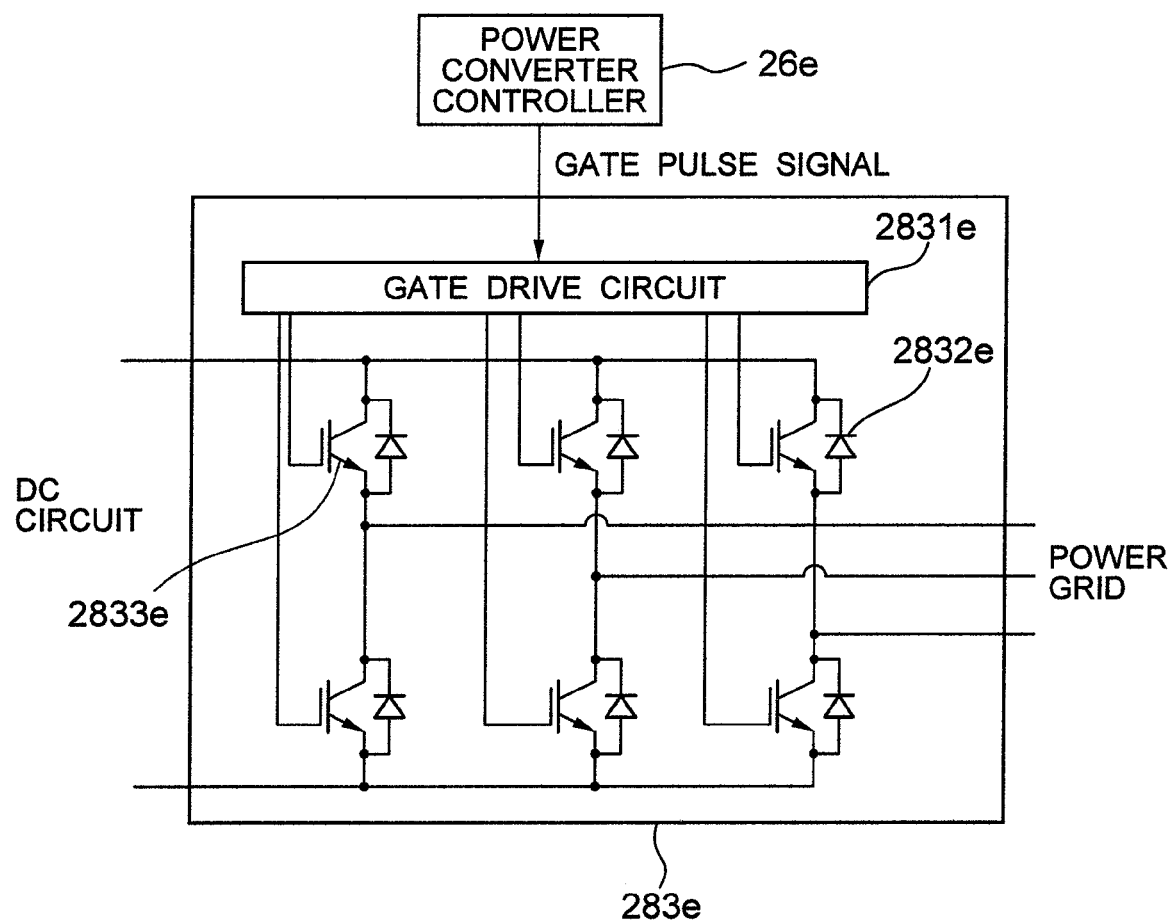
FIG. 22 shows the detailed configuration of the grid-side power converter.

FIG. 22 shows the detailed configuration of the grid-side power converter 238e, which consists of IGBTs 2833e, free wheeling diodes 2832e and a gate drive circuit 2831e for driving the IGBTs 2833e in response to the gate pulse signal issued from the power converter controller 26e. The IGBT 2833e will have a high risk of breakdown if it performs a switching operation while current exceeding a certain threshold is flowing through it. To eliminate this risk, the power converter controller 26e, when it detects over current, delivers to the grid-side power converter 283e a signal for stopping the switching operation of the grid-side power converter 283e. The cause of over current may include a grid failure, a short-circuit fault in any constituent device of the power converter, and an erroneous operation of the power converter controller 26e.

Figure 23:
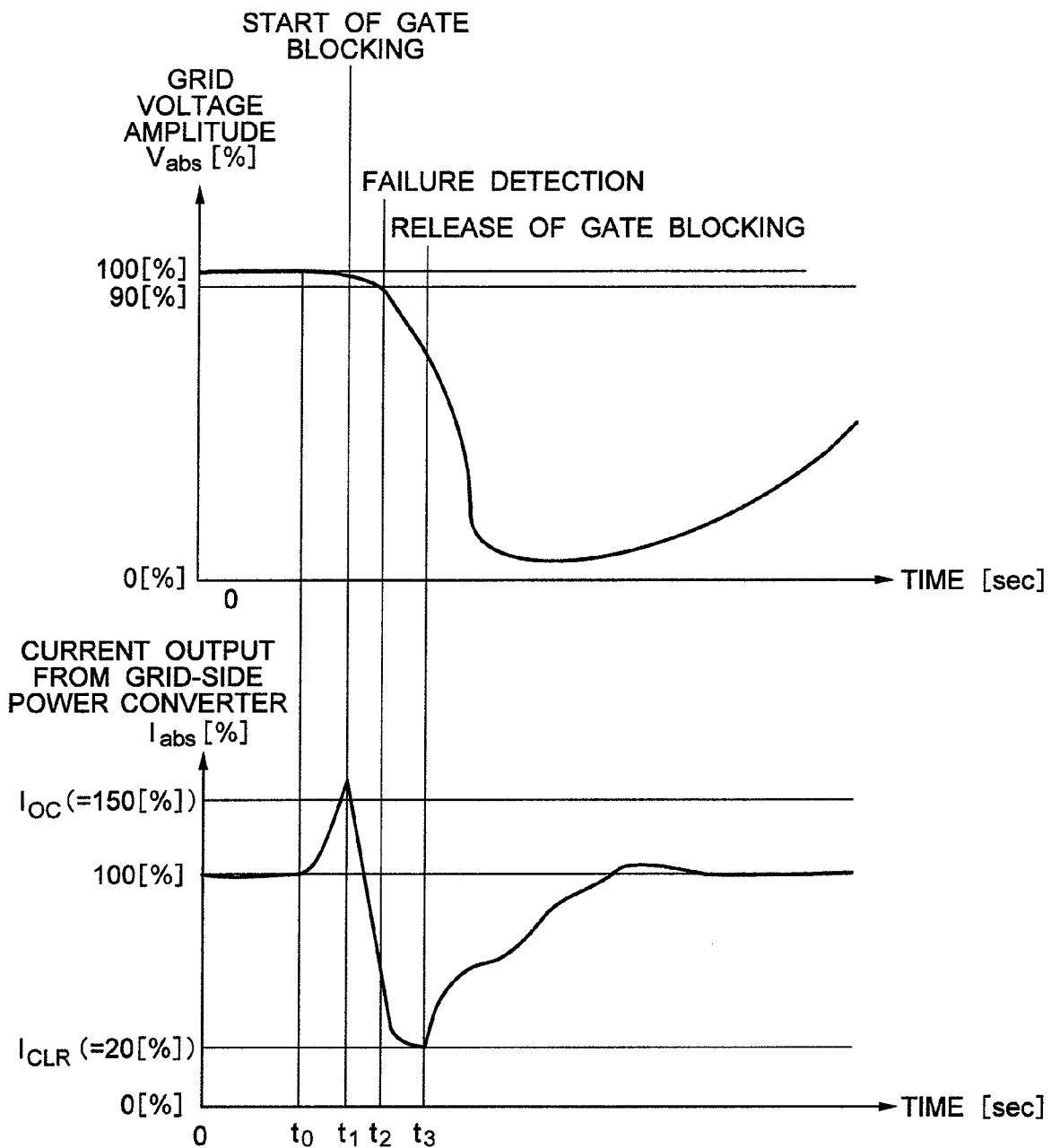
FIG. 23 graphically shows the variations with time of the grid voltage amplitude and the output current of the grid-side power converter when the grid voltage is in a low voltage event.

FIG. 23 graphically shows the behaviors of the values of $V_{abs}$ and $I_{abs}$ detected when the grid voltage falls due to a grid failure. In FIG. 23, it is assumed that a grid failure occurs at time $t_0$, that the grid voltage $V_{abs}$ is normal ($V_{abs}$=100%) before $t_0$, and that the wind power generation system is operating with rated power delivering before $t_0$ ($I_{abs}$=100%).

Immediately after to, the grid voltage starts lowering. This causes the current controllability of the grid-side power converter 283e to deteriorate so that the current amplitude $I_{abs}$ starts increasing. If the rate of grid voltage fall is fast enough, the increase in $I_{abs}$ is also fast. Accordingly, the detection of over current such that $I_{abs}>I_{OC}$, taking place at $t_1$ occurs earlier than the detection of the grid failure such that $V_{abs}<90\%$, taking place at $t_2$. Consequently, the wind power generation system must first switch its control procedure into the mode for over current control, and then switch over from the over current control mode to the mode for coping with the grid voltage fall.

Figure 24:
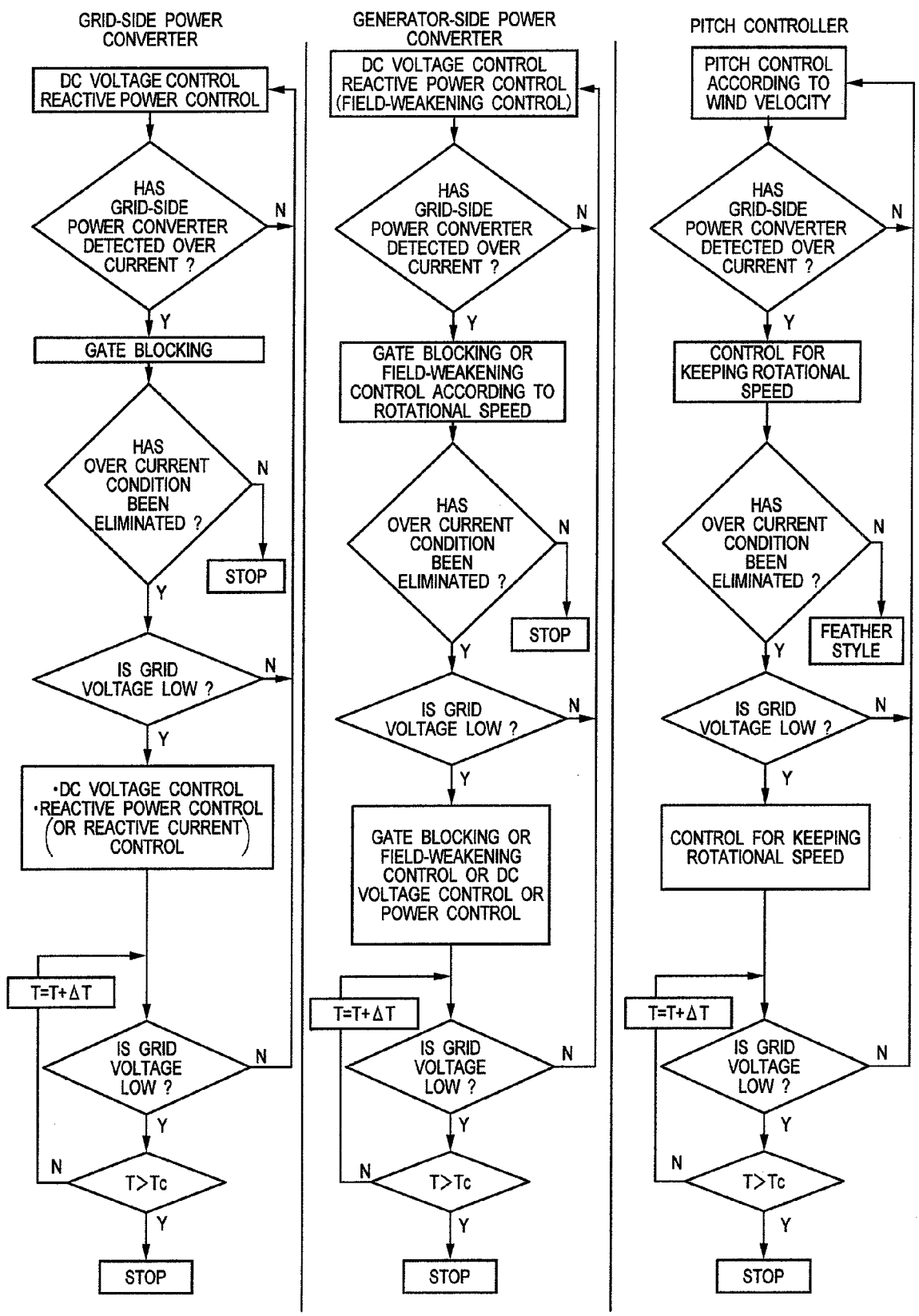
FIG. 24 shows flow charts for explaining different operations of the wind power generation system when over current is detected.

FIG. 24 shows flow charts for the control of the wind power generation system when over current is detected. The time sequential flow of the control operations from the detection of over current to the restart of power generating operation will be described below.

1) At Over Current Detection

When the power converter controller 26e detects over current, the grid-side power converter 283e is gate-blocked, that is, the power converter controller 26e stops issuing the gate pulse signal which drives the power converter 283e. If the over current is caused as a result of a grid voltage fall, the gate blocking operation causes the current amplitude $I_{abs}$ to decrease rapidly. If the gate blocking operation cannot decrease the current amplitude, there is a high possibility that a failure occurring in at lease one of the constituent devices of the wind power generation system has resulted in the over current. Therefore, the system controller 25e sends an "open" signal to a circuit breaker 5e to bring the wind power generation system into the shutdown state.

On the other hand, the generator-side power converter 281e is operated in a way different from that employed in the case of over current being detected in the power grid, because of the influence of the rotational speed of the permanent magnet generator 23e. The voltage induced in the permanent magnet generator 23e increases with the increase in the rotational speed. When the induced voltage exceeds the output voltage of the generator-side power converter 281e, power control becomes impossible. To prevent this, a control called "field-weakening control" is performed. The field-weakening control is an operation wherein the terminal voltage of the permanent magnet generator 23e is lowered by causing the generator-side power converter 281e to control the reactive power supplied to the stator winding of the permanent magnet generator 23e.

Figure 25:
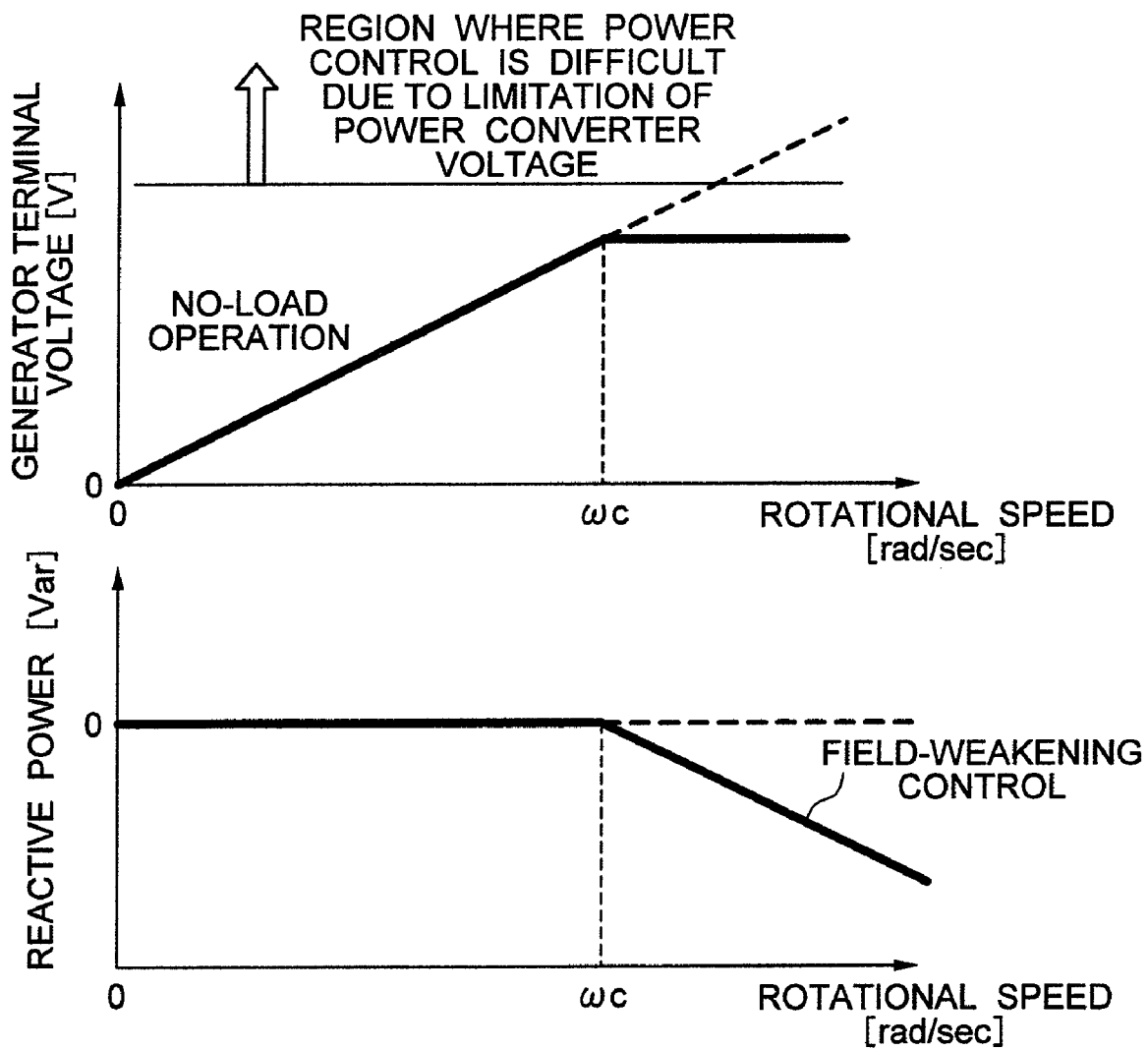
FIG. 25 graphically shows the terminal voltage of the generator and the reactive power, versus the rotational speed, in the field-weakening control.

FIG. 25 graphically shows the terminal voltage of the permanent magnet generator 23e and the reactive power supplied to the stator winding of the permanent magnet generator 23e, versus the rotational speed, in the field-weakening control. The terminal voltage of the permanent magnet generator 23e increases in approximate proportion to its rotational speed in the no-load state. Therefore, when the rotational speed exceeds a certain threshold, the terminal voltage exceeds the output voltage of the generator-side power converter 281e so that the control of the output power of the permanent magnet generator 23e becomes impossible. To cope with this situation, the generator-side power converter 281e supplies reactive power to the generator in the operating region where the rotational speed exceeds a predetermined threshold ωc [rad/sec]. The supplied reactive power suppresses the increase in the generator terminal voltage and thereby makes it possible to allow the generator-side power converter 281e to control power in the operating region of high rotational speeds. In the example shown in FIG. 25, the output of the reactive power is linearly varied with respect to the rotational speed. To obtain the same result, however, this procedure is not only one available, but it is also possible to use a different type of a field-weakening control wherein the output of the reactive power is varied in a manner other than the linear one.

When over current occurs in the grid-side power converter 283e, the grid-side power converter 283e is subjected to gate blocking so that no power can be supplied to the power grid. Accordingly, in order to suppress the increase in the DC voltage in the DC circuit portion of the power converter 28e, the generator-side power converter 281e must stop the inflow of active power from the permanent magnet generator 23e. For high rotational speeds, there may be a case where the generator-side power converter 281e must continue to supply reactive power to the permanent magnet generator 23e. This is because the DC voltage in the DC circuit portion of the power converter 28e increases due to the inflow of the generator energy into the DC circuit portion via the free-wheel diode in the power converter 28e when the terminal voltage of the permanent magnet generator 23e exceeds the DC voltage in the power converter 28e due to the increase in the rotational speed. In such a case, the increase in the DC voltage in the DC circuit portion can be suppressed by decreasing the terminal voltage through field-weakening control. For high rotational speeds, therefore, the generator-side power converter 281e is so controlled as to reduces the active power at the terminal of the permanent magnet generator 23e to 0 [W], whereas the field-weakening control through reactive power control is continued at the same time. This makes it possible to suppress the increase in the DC voltage in the DC circuit portion during a failure and also to resume current and power controls immediately after the recovery from the failure. In the case where the rotational speed of the permanent magnet generator 23e is low so that the generator terminal voltage is lower than the DC voltage in the DC circuit portion of the power converter 28e, electric charging does not occur in the DC circuit portion, and therefore the generator-side power converter 281e may be subjected to gate blocking to stop its conductive state.

There is also need for field-intensifying control depending on the voltage characteristic of the permanent magnet generator 23e. In the permanent magnet generator 23e, the induced voltage decreases with the decrease in the rotational speed. Accordingly, there may be a case where a large amount of current is needed for power control in the operating region of low rotational speeds. If the current amount exceeds the upper limit of current capacity of the generator-side power converter 281e, power control becomes difficult.

Figure 26:
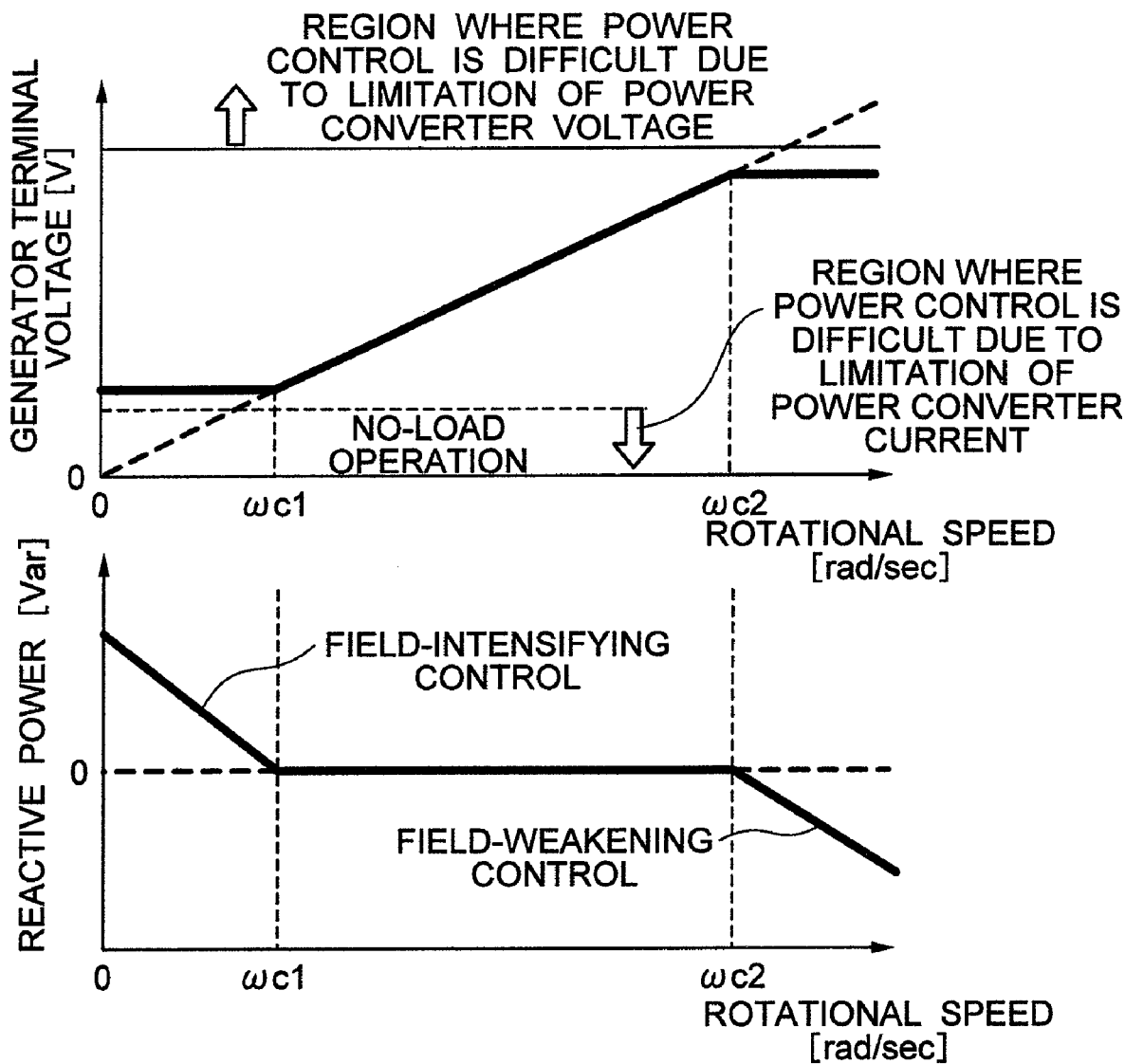
FIG. 26 graphically shows the terminal voltage of the generator and the reactive power, versus the rotational speed, in the field-weakening and field-intensifying controls.

FIG. 26 graphically shows the terminal voltage of the permanent magnet generator 23e and the reactive power supplied to the stator winding of the permanent magnet generator 23e, versus the rotational speed, in the field-intensifying control. As shown in FIG. 26, the field-intensifying control outputs reactive power in a way to increase the generator terminal voltage in the operating region of low rotational speeds. This allows the generator-side power converter 281e to output small current even in the operating region of low rotational speeds so that power control becomes possible.

When over current is detected during field-intensifying control while the rotational speed is low, the generator-side power converter 281e is so controlled as to reduces the active power at the terminal of the permanent magnet generator 23e to 0 [W], whereas the field-intensifying control is continued at the same time. This makes it possible to control the DC voltage in the DC circuit portion during a failure and also makes it easy to resume current and power controls immediately after the recovery from the failure.

On the other hand, since the generator-side power converter 281e is so controlled as to reduce the active power term P in the expression (10) approximately to zero in the event of over current, the rotational speed of the rotor increases. Accordingly, as described above with the first embodiment, the pitch controller 111e controls the blade pitch in such a manner that the rotational speed of the rotor is confined within the operable range.

There is a case of over rotation where the rotational speed of the rotor becomes extremely high due to the delay in the follow-up of pitch control or the insufficient suppression of excessively high rotational speed through pitch control, owing to a rapid rise in the wind velocity. In the event of such over rotation, the wind power generation system stops its power generating operation to protect its constituent parts and shifts to the standby state. At the time the system enters into the standby state, the circuit breaker 295e located between the permanent magnet generator 23e and the generator-side power converter 281e is opened. Even in the state of over rotation, the field-weakening control on the generator side is continued until the circuit breaker 295e is opened. By continuing the field-weakening control, the increase in the voltage in the DC circuit portion due to the inflow of energy from the generator can be prevented.

2) From Over Current Decrease to Over Current Elimination

The power converter controller 26e continues to monitor the grid voltage and grid current $V_{abs}$ and $I_{abs}$ by performing calculations according to the expressions (13) and (14) even while the grid-side power converter 283e is in the gate-blocked state. When $I_{abs}$ becomes smaller than a predetermined value $I_{CLR}$ (i.e. $I_{abs} < I_{CLR}$), the power converter controller 26e makes decision that over current condition has been eliminated. At this time, decision is made, depending on the magnitude of $V_{abs}$, on whether the power grid is in the low voltage state, or in the normal state. The ensuing control procedure is chosen depending on the result of the decision.

2-1) Restart when the Grid Voltage is Normal

If the grid voltage amplitude $V_{abs}$ is larger than a predetermined value $V_{GF}$ when over current condition is eliminated, the power converter controller 26e makes decision that the grid voltage is normal, so that the wind power generation system resumes its operation.

The grid-side power converter 283e is released from the gate-blocked condition and resumes its DC voltage sustenance control and reactive power control. The generator-side power converter 281e resumes its control of active and reactive powers in accordance with the active and reactive power commands from the system controller. The system controller 25e transfers the pitch command in the normal power generating operation to the pitch controller 111e. The system controller 25e also transfers the power command to the power converter controller 26e.

2-2) Restart when the Grid Voltage is Low

The process of restarting the wind power generation system needs to be properly chosen in accordance with the running standard associated with the power grid connected with the wind power generation system under consideration.

If the standard mandates the disconnection of the wind power generation system from the power grid in the event of abnormally low grid voltage, the wind power generation system continues the gate-blocking operation as described under the above caption "1) Over Current Detection" and then resumes the power generating operation following the procedure described under the above caption 2-1) after the grid voltage is restored to the normal level. However, if the condition of abnormally low voltage in the power grid persists for longer than a predetermined time, the wind power generation system as a whole is transferred into the standby state.

If the standard permits the connection of the wind power generation system with the power grid in the event of abnormally low grid voltage, the grid-side power converter 283e is released from the gate-blocked condition and resumes DC voltage control. Also, the generator-side power converter 281e resumes controls of active and reactive powers according to the active and reactive power commands from the system controller 25e. In the state of abnormally low grid voltage, since no generated power can be supplied to the power grid, the wind power generation system tends to suffer over rotation. To prevent such over rotation, the pitch controller 111e controls the blade pitch in a way to confine the rotational speed within the operable range as described above in the Embodiments 1 and 2.

Sometimes, the running standard stipulates the operation for the wind power generation system to supply reactive power in the state of abnormally low grid voltage. If the wind power generation system is connected with a power grid having such a running standard, the grid-side power converter 283e is released from the gate-blocked condition and resumes DC voltage control and reactive current control without resorting to reactive power control. The amount of the outputted reactive current is defined in the standard, and the defined amount is actually delivered. The generator-side power converter 281e also resumes active and reactive power controls according to the active and reactive power commands from the system controller. In the state of abnormally low grid voltage, since no generated power can be supplied to the power grid, the wind power generation system tends to suffer over rotation. To prevent the over rotation, the pitch controller 111e controls the blade pitch in a way to confine the rotational speed of the rotor within the operable range.

Some running standards may prohibit the wind power generation system and the power grid from exchanging active power between them in the state of abnormally low grid voltage. Moreover, in the case where 100% of reactive power is required to be outputted, only small amount of active power can be inputted or outputted due to the limitation in the capacities of the constituent parts. The following expression (16) gives the relationship between the active power and the DC voltage $V_{DC}$ in the DC circuit portion of the power converter 28e.

$$CV_{DC}\frac{d}{dt}V_{DC} = P_{gen} - P_{SYS} - P_{LOSS} \quad (16)$$

In above the expression, $V_{DC}$ [V] denotes the DC voltage in the power converter 28e, C [F] the capacitance of the intermediate smoothing capacitor 282e, $P_{SYS}$ [W] the active power delivered from the grid-side power converter 283e to the power grid (i.e. power generated by the wind power generation system), $P_{gen}$ [W] the active power delivered from the generator-side power converter 281e to the DC circuit portion of the power converter 28e, and $P_{LOSS}$ [W] the energy dissipated through various losses. While the power grid is in the state of failure, the grid voltage is abnormally low so that the grid-side power converter 283e cannot controllably increase the generated power $P_{SYS}$ up to the rated value. Accordingly, as described above in first embodiment, the grid-side power converter 283e controls the DC voltage in the normal power generating operation whereas the generator-side power converter 281e may control the DC voltage while the power grid is in the state of failure.

3) Control at the Time of the Grid Voltage Recovery

The power converter controller 26e continues to monitor the grid voltage amplitude $V_{abs}$ even while the power grid is in the event of low voltage. When $V_{abs}$ becomes larger than a predetermined value, the power converter controller 26e makes decision that the grid voltage has been restored to the normal level, and then the wind power generation system resumes its power generating operation. In fact, the grid-side power converter 283e performs DC voltage control and reactive power control whereas the generator-side power converter 281e performs active power control and reactive power control.

On the other hand, since the grid voltage fluctuates when it returns to the normal level, the grid-side power converter 283e tends to cause an over current phenomenon. When the power converter controller 26e detects such over current, the wind power generation system can resume its power generating operation by following the control procedure as described above.

The gist of the present invention described in this third embodiment can be applied to not only the wind power generation system having a pitch control function but also the wind power generation system that does not have a pitch control function but instead has a stalling function.

By using such control procedures as described above, even when over current occurs in the grid-side power converter, the wind power generation system can continue to be run without being disconnected from the power grid. Hence, the effective operating time of the wind power generation system can be prolonged with the result that the quantity of generated power is increased. Further, this pitch control procedure enables the immediate supply of power after a grid failure and therefore contributes much to the stabilization of the power grid as a whole.

The foregoing description of this invention is dedicated mainly to the wind power generation system incorporating therein a permanent magnet generator. However, it is apparent that this invention can equally applied to any wind power generation system having a grid-side power converter such as any wind power generation system having a doubly fed induction generator as shown in FIG. 3 or having a DC excitation synchronous generator 23c as shown in FIG. 17.

Further, the concept of this invention has been realized in each embodiment individually as described above, but can also be implemented by combining two or three of the embodiments.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wind power generation system comprising:
a rotor having blades coupled mechanically thereto, the pitch of the blades being variable;
a generator driven by the rotor;
a power converter connected electrically with the generator for controlling the power supplied to a power grid;
a pitch control unit for controlling the pitch of the blades;
an abnormality detecting unit for detecting an abnormal condition occurring in the power grid or the wind power generation system;
a first pitch control unit for controlling the pitch of the blades in the case where the abnormality detecting unit detects no abnormal condition; and
a second pitch control unit for controlling the pitch of the blades in the case where the abnormality detecting unit detects an abnormal condition, wherein the second pitch control unit keeps the rotational speed of the rotor within a operable range of rotational speed for the wind power generation system.

2. A wind power generation system as claimed in claim 1, wherein a first predetermined value and a second predetermined value smaller than the first predetermined value are defined for the control of the rotational speed of the rotor; the second pitch control unit fixes the blade pitch to a predetermined value when the rotational speed of the rotor is smaller than the upper limit of the operable range of rotational speed for the wind power generation system and greater than the first predetermined value; and the second pitch control unit maximizes the blade pitch when the rotational speed of the rotor is greater than the lower limit of the operable range of rotational speed for the wind power generation system and the second predetermined value.

3. A wind power generation system as claimed in claim 2, wherein the second pitch control unit varies the blade pitch in accordance with the rotational speed of the rotor or the wind velocity when the rotational speed of the rotor is equal to or smaller than the first predetermined value and equal to or greater than the second predetermined value.

4. A wind power generation system as claimed in claim 2, wherein the second pitch control unit fixes the blade pitch to a predetermined value when the rotational speed of the rotor is equal to or smaller than the first predetermined value and equal to or greater than the second predetermined value.

5. A wind power generation system as claimed in claim 1, wherein the second pitch control unit fixes the target value for the rotational speed of the rotor as a value lying within the operable range of rotational speed for the wind power generation system.

6. A wind power generation system as claimed in claim 1, wherein the abnormality detecting unit detects the condition that the voltage amplitude of the power grid is greater or smaller than a predetermined range.

7. A wind power generation system as claimed in claim 1, wherein the abnormality detecting unit detects the condition that the amplitude of the current drawn from the wind power generation system or the power converter is greater than a predetermined value.

8. A wind power generation system as claimed in claim 1, wherein the abnormality detecting unit detects the condition that the frequency of the grid voltage is greater or smaller than a predetermined range.

9. A wind power generation system as claimed in claim 1, wherein the power converter is rendered to gate-blocked condition when the abnormality detecting unit detects an abnormal condition.

10. A wind power generation system as claimed in claim 1, wherein the second pitch control unit varies the blade pitch in accordance with the amplitude of the grid voltage.

11. A wind power generation system as claimed in claim 1, wherein the power supplied to the power grid is controlled in accordance with the amplitude of the grid voltage.

12. A wind power generation system as claimed in claim 10, wherein the power supplied to the power grid is controlled in accordance with the amplitude of the grid voltage.

13. A wind power generation system as claimed in claim 10, wherein the second pitch control unit varies the blade pitch down to the feathered state when the amplitude of the grid voltage is smaller than a predetermined value.

14. A wind power generation system as claimed in claim 1, wherein the second pitch control unit controls the rotational speed in accordance with the rotational speed of the rotor when the amplitude of the grid voltage is larger than a third predetermined value, varies the blade pitch down to the feathered state when the amplitude of the grid voltage is smaller than a fourth predetermined value smaller than the third predetermined value, and varies the blade pitch to a predetermined angle when the amplitude of the grid voltage is equal to or smaller than the third predetermined value and equal to or greater than the fourth predetermined value.

15. A wind power generation system as claimed in claim 1, further comprising a reactive power control unit for controlling the reactive power supplied from the power converter to the generator when the abnormality detecting unit detects an abnormal condition.

16. A wind power generation system as claimed in claim 9, wherein when the abnormality detecting unit detects no abnormal condition while the power converter is in the gate-blocked condition, the gate-blocked condition is released.

* * * * *